United States Patent [19]

Gupta et al.

[11] Patent Number: 5,470,892
[45] Date of Patent: Nov. 28, 1995

[54] POLYMERIZABLE RESIN FOR FORMING CLEAR, HARD PLASTICS

[75] Inventors: Amitava Gupta, San Marino, Calif.; Ronald D. Blum, Roanoke, Va.

[73] Assignee: Innotech, Inc., Roanoke, Va.

[21] Appl. No.: 877,105

[22] Filed: May 1, 1992

[51] Int. Cl.⁶ .............................. B29D 11/00; C08F 26/02
[52] U.S. Cl. .............................. 522/42; 264/1.38; 264/1.7; 522/71; 523/300; 524/492
[58] Field of Search .............................. 264/22, 1.38, 1.7; 156/273.5, 275.5, 275.7; 522/6, 12, 13, 19, 21, 42, 71; 523/300; 524/492; 427/163

[56] References Cited

U.S. PATENT DOCUMENTS

| | | |
|---|---|---|
| 2,339,433 | 1/1944 | Staele . |
| 3,038,210 | 6/1962 | Hungerford et al. . |
| 3,222,432 | 12/1965 | Grandperret . |
| 3,248,460 | 4/1966 | Naujokas . |
| 3,946,982 | 3/1976 | Calkins . |
| 4,166,088 | 8/1979 | Neefe . |
| 4,190,621 | 2/1980 | Greshes . |
| 4,298,005 | 11/1981 | Mutzhas . |
| 4,512,340 | 4/1985 | Buck . |
| 4,544,572 | 10/1985 | Sandvig et al. . |
| 4,623,496 | 11/1986 | Verehoven . |
| 4,758,448 | 7/1988 | Sandvig et al. . |
| 4,822,864 | 4/1989 | Chen . |
| 4,873,029 | 10/1989 | Blum . |
| 4,879,318 | 11/1989 | Lipscomb et al. . |
| 4,902,725 | 2/1990 | Moore . |
| 4,912,185 | 3/1990 | Toh . |
| 4,919,850 | 4/1990 | Blum et al. . |

FOREIGN PATENT DOCUMENTS

| | | |
|---|---|---|
| 80556/87 | 6/1988 | Australia . |
| 59-039526 | 3/1984 | Japan . |

*Primary Examiner*—Mathieu D. Vargot
*Attorney, Agent, or Firm*—Christie, Parker & Hale

[57] ABSTRACT

A photopolymerizable resin is formed from between about 50% to 90% by weight of a polymerizable base component, between about 1% and 20% by weight of a cross-linker, between about 0.5% and 6% by weight of a photoinitiator, and between about 0.5% and 20% by weight of a viscosity control agent. Preferably the resin has a viscosity above 25 and below 130 centistokes at 68° F. In a preferred embodiment, the resin includes between about 0.5% and 3.0% by weight of fumed silica or fine mesh silica as a viscosity control agent, and is cured under the combined influence of heat and actinic radiation to form a clear, hard, plastic optic having a refractive index of greater than or equal to 1.50 and a scratch resistance greater than or equal to 1.0 in a Bayer abrader and hazemeter. A method and apparatus for forming improved ophthalmic lenses is also included.

38 Claims, 7 Drawing Sheets

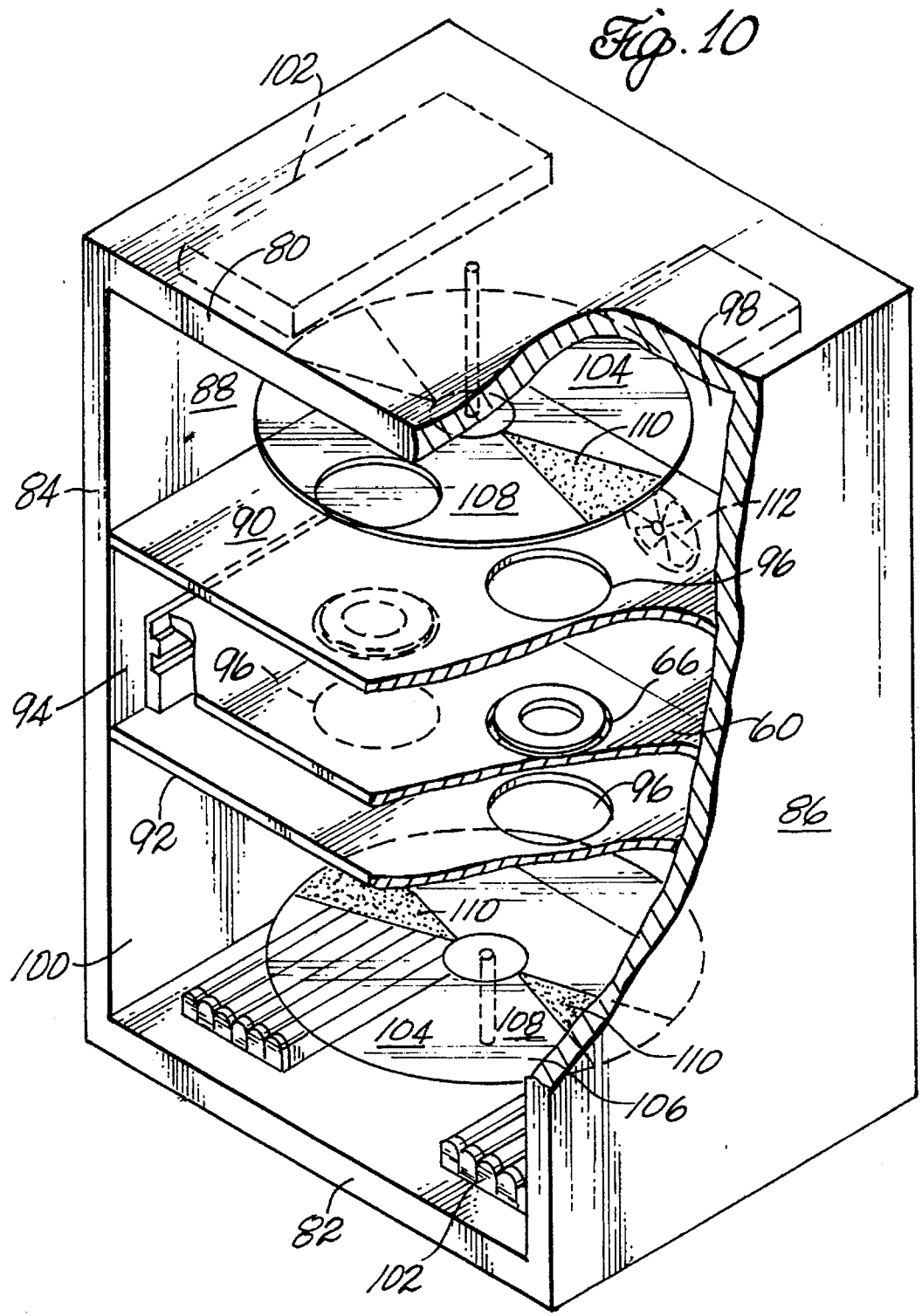

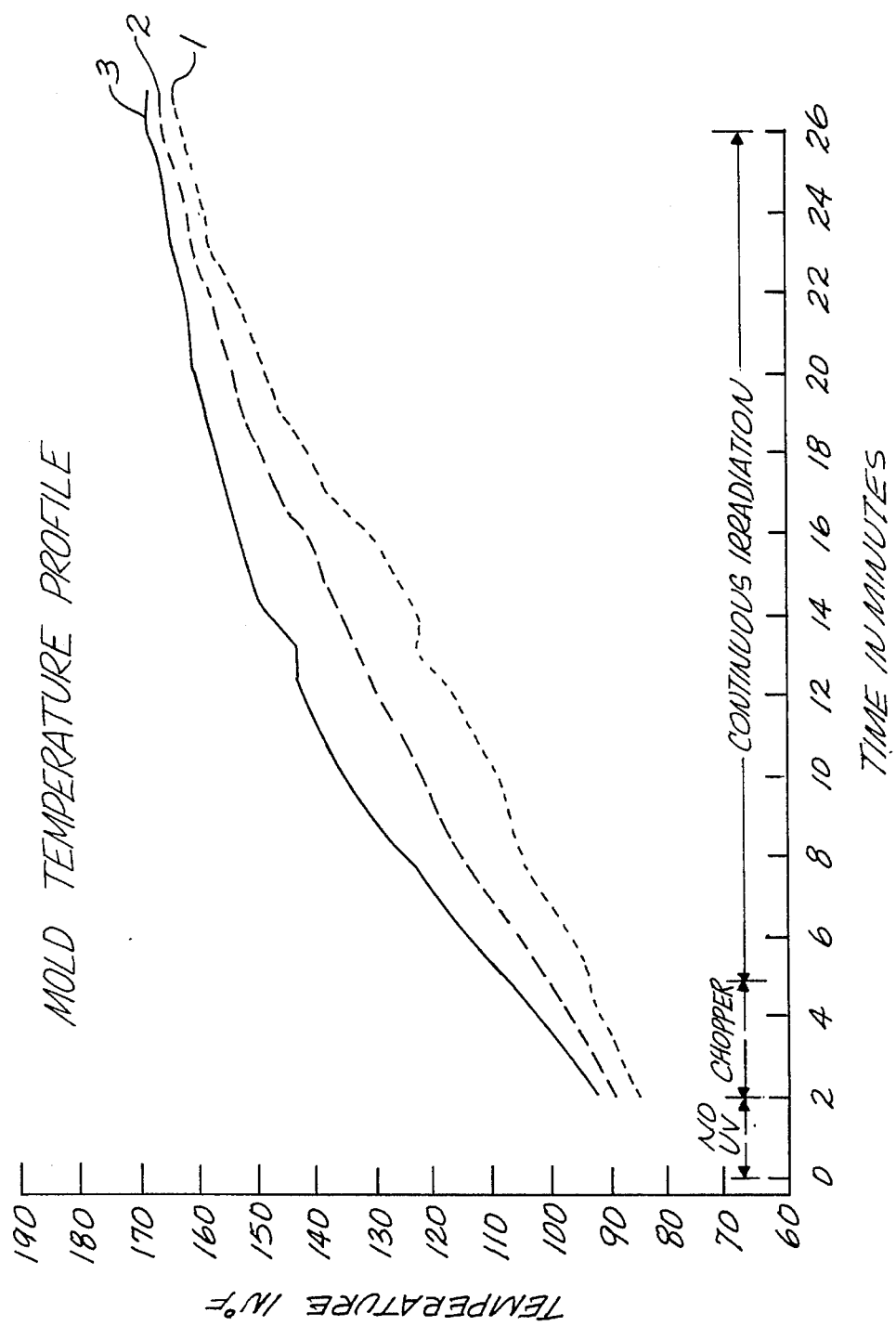

POLYMERIZABLE RESIN FOR FORMING CLEAR, HARD PLASTICS

FIELD OF THE INVENTION

This invention relates generally to compositions and methods for making clear, hard plastics from polymerizable resins, and in a preferred embodiment is specifically directed to a resin useful in forming spherical or aspheric, single-vision, progressive, or multi-focal ophthalmic lenses from finished or unfinished preforms.

BACKGROUND OF THE INVENTION

Lens forming methods are described in application Ser. No. 07/779,317, filed Oct. 18, 1991, which was a continuation in part of application Ser. No. 07/740,946, filed Aug. 6, 1991, which was a continuation in part of application Ser. No. 07/594,136, filed Oct. 10, 1990, which was a continuation in part of application Ser. No. 07/446,151, filed Dec. 5, 1989, which was a continuation in part of application Ser. No. 07/422,399, filed Oct. 12, 1989, application Ser. No. 07/339,217, filed Apr. 17, 1989, and application Ser. No. 07/190,856 filed May 6, 1988, and of application Ser. No. 07/114,962, filed Oct. 30, 1987, now U.S. Pat. No. 4,873,029, all of which are hereby incorporated by reference.

An excellent summary of conventional compositions, methods, and apparatus for making plastic lenses is provided in U.S. Pat. No. 4,879,318, to Lipscomb et al. (All patents and other documents mentioned herein are incorporated by reference as if reproduced in full below.) In particular, Lipscomb et al. teach that conventional lens forming compositions include diethylene glycol bis(allyl)-carbonate (DEG-BAC), and one or more monofunctional or multifunctional acrylate monomers that can be thermally or radiation cured to produce hard, tough, clear, and strain-free optics. Photoinitiators may be selected from the group consisting of 2-hydroxy-2-methyl-1-phenylpropan-1-one and 1-hydroxycyclohexylphenyl ketone. The monofunctional or multifunctional acrylate monomers may be selected from tetrahydrofurfuryl acrylate (TFFA), trimethylol propane triacrylate (TMPTA) and tetrahydrofurfuryl methacrylate (TFFMA).

Lipscomb et al. found that, by mixing DEG-BAC with additives or comonomers, its cracking tendency could be decreased. The rate of polymerization was increased by combining an acrylate containing group with DEG-BAC polymer; suitable acrylate groups include tetraethylene glycol diacrylate (TTEGDA), tripropylene glycol diacrylate (TRPGDA), trimethylol propane triacrylate (TMPTA), tetrahydrofurfuryl methacrylate (TFFMA), and tetrahydrofurfuryl acrylate (TFFA).

TTEGDA tends to increase the overall rate of polymerization, and tends to reduce the amount of yellowing in a finished lens, but TTEGDA also tends to increase lens cracking. TRPGDA also increases the rate of polymerization, while TMPTA and TTFMA tend to prevent the development of patterns and fringes in finished lens. TFFA tends to reduce cracking and the development of patterns in the finished lens, and also tends to reduce the degree to which a lens sticks to a mold; more than 25% by weight of TFFA should not be included in a DEG-BAC lens, since a proportion greater than 25% tends to decrease the hardness of the finished lens.

Convective striations or optical inhomogeneity, referred to as "patterns" or "wavy patterns," are defects which usually occur during early stages of polymerization, during which the resin composition is transformed from a liquid to a gel state; once patterns form, they are almost impossible to eliminate. Further, when gelation occurs, there is a rapid temperature rise due to the exothermic polymerization reaction, and, in positive lenses, the temperature can quickly reach 85° C., and lead to lens fracture. The exothermic reaction also causes an increase in the rate of polymerization, which in turn causes a further increase in temperature. Therefore, heat exchange with the surroundings must be efficient enough to avoid uncontrolled rapid polymerization, which can lead to the appearance of thermally caused striations and/or breakage. Thus, the gelation point is a critical phase of the polymerization reaction, since the rate of polymerization increases rapidly at the gelation point.

Lipscomb et al. teach that the best quality lenses result from a smooth reaction process which is not too fast or slow. The heat generated by the exothermic polymerization reaction must not be generated faster than it can be exchanged with the surroundings. The resin of Lipscomb et al. is cured with ultra-violet light having the intensity adjusted to control the reaction rate. Blockage of shorter wavelengths below 320 nm was found to be absolutely essential by Lipscomb et al., since the full intensity of ultra-violet light striking the glass mold caused breakage of the mold.

An alternate embodiment of Lipscomb et al. replaces DEG-BAC with the monomer 4,4'-isopropylidene diphenol diallyl carbonate (bisphenol A diallyl carbonate) in admixture with faster reacting monomers, such as trimethylol propane triacrylate (TMPTA), hexanediol dimethacrylate (HDDMA), tetraethylene glycol diacrylate (TTEGDA), tripropylene glycol diacrylate (TRPGDA), and styrene (generally, compounds containing acrylate groups polymerize much faster than those containing allyl groups).

Since Lipscomb et al. is directed to forming whole lenses in a mold cavity surrounded by a gasket, it is necessary to carefully control the cure temperature to avoid cracking and to obtain uniform curing throughout the thickness of the lens. Lipscomb et al. rigorously control cure temperature by actively cooling the mold assembly during the cure process in order to dissipate the heat of polymerization, and thus avoid mechanical deformation or cracking. However, curing at a low temperature results in a lower glass transition temperature and a lower degree of cross-linking, which leads to lenses having a lower scratch resistance, lower durability, and a lower Barcol hardness. Further, Lipscomb et al. avoid the formation of a gradient of cross-link density through the lens, which can occur by having an accelerated rate of cure at the surface; formation of such a hard surface is actually beneficial to a final optic, but Lipscomb et al. are forced to forego this benefit because of the necessity for curing resin layers having a thickness of 5 mm or greater. The resins of Lipscomb et al. are formed of low viscosity monomers, and, when cured, form optics having relatively low glass transition temperatures, even though they may reach relatively high levels of cross-link density.

Various other methods for casting monofocal, bifocal, progressive, and astigmatic correction lenses are known. Generally, all of these methods involve curing of a suitable resin in a mold. In all cases, casting of finished ophthalmic lenses (in contrast to a semi-finished blanks) over a wide range of prescriptions, requires the use of some type of restrictive apparatus, which holds the mold form(s) in fixed spatial relationship with respect to one another (e.g., gasket or edge fixture). In some cases, a semifinished or finished preformed optic (also known as a "blank," "preformed optic," "preformed blank," "single vision optic", etc . . . ) forms part of the mold assembly, and becomes part of the finished optic. The various prior art mold apparatus either adjust for the shrinkage of the resin through the use of a gasket or edge fixture, or restrict the range of optical prescriptions which can be achieved by forming a lens by molding.

For example, U.S. Pat. No. 4,190,621, to Greshes, discloses the formation of a bifocal lens on a previously formed blank lens, by casting the optic between a mold and a preform. The preform is placed in fixed vertically spaced relationship to a lower mold in a retaining support apparatus. The support apparatus holds an upper mold or preformed blank a few thousandths of an inch (greater than or equal to 0.025 mm) above the lower mold, and thus maintains a separation between the mold and the upper mold or preformed blank; an optical resin material is placed in the lower mold, such that the upper mold or preformed blank causes displacement of the resin material, so that the resin extends between the overlapping surfaces of the molds to form a desired lens configuration (prescription).

In the absence of the support apparatus, the upper mold or preformed blank of Greshes would sink down into the resin, so there would not be a sufficiently thick resin layer between the preformed blank (or upper mold) and the lower mold to form an acceptable optic. Thus, in order to form lenses of differing prescriptions, numerous different supports are required, which provide for differing separations between the lower mold and the upper mold or preformed blank. The apparatus and method of Greshes are incapable of forming plus or minus power progressive lenses which necessitate curing a thick (greater than 1.0 mm) resin layer at or about the progressive addition area, while maintaining an acceptable edge thickness.

There are numerous other ophthalmic lens forming methods disclosed in the prior art. For example, U.S. Pat. No. 3,946,982, to Calkins, utilizes two mold portions held together by a gasket; one of the mold portions includes a bifocal segment. A liquid resin is injected into the cavity formed between the two molds and cured. U.S. Pat. No. 4,873,029, to Blum, discloses a thermal casting method, which involves the use of either two molds and an intervening resin layer sealed into a mold assembly by a gasket, or a mold and a single vision wafer (preform) sealed into a mold assembly by a gasket. It is undesirable to use gaskets, since gaskets impose critical limitations on "point of use" or "in-office" optics casting processes, such as (1) a very large number of gaskets have to be stocked in order to cast on demand a practically useful range of prescriptions, (2) it is more difficult to perform the assembly and the filling process of a molding apparatus using gaskets, (3) gaskets impose a limitation on the relative size of a preformed optic or blank and a mold (e.g., a smaller preform can not be used with a larger mold), and (4) gaskets cause shadowing at the lens edges or leave the edges uncured in a photocuring process.

U.S. Pat. No. 4,623,496, to Verehoven, discloses a method of casting aspheric lenses from a spherical substrate in which the substrate matrix can be positioned without a guiding mechanism, and uses a weight to press a substrate into resin placed in a mold to form a very thin resin layer. Verehoven achieves this by severely restricting the range of prescription (i.e., thickness of the cast polymer layer), and by limiting the range of radii of curvature, and hence the spherical power of the substrate. In order to achieve the desired separation between the substrate and the matrix, a series of inflection points is situated in a circle at the point where the substrate and matrix are closest to each other. Verehoven accepts limitations on the range of radii of curvature and power of the resulting lenses in order to minimize problems due to shrinkage of the resin during the cure process. Further, due to the thinness of the cast layers of Verehoven around the infection points, the resulting lenses will not evenly tint.

U.S. Pat. No. 2,339,433, to Staehle, discloses the casting of monofocal or multifocal lenses by adding a correction to a molded plastic lens; a thin, relatively uniform layer of plastic is cast onto a single vision optic in order to form a monofocal optic, and the resin layer is then thermally cured. The resin must have the same refractive index as the preformed plastic lens. It is not possible to produce bifocal or multifocal lenses having a wide range of prescriptions with Staehle's method, and the method is only useful for adding a thin, relatively uniform layer of plastic to a single vision optic in order to form a monofocal optic.

U.S. Pat. No. 3,248,460, to Naujokas, discloses a method for casting multifocal lenses, in which a base blank is used, having a curvature only about half of the curvature of the predetermined power of the final optic. The limitation in the curvature of the preformed lens blank is necessitated by the need to control variation in the thickness of the liquid resin layer to be cured in order to form the final optic over the entire optic surface.

U.S. Pat. No. 4,166,088, to Neefe, discloses formation of plastic lenses by curing a mixture of a liquid monomer and a photosensitive initiator in a mold cavity formed between a pair of spaced apart molds, and uses ultra-violet light to cure the resin. U.S. Pat. No. 4,298,005, to Mutzhas, discloses a suitable ultra-violet source for curing of optical resins. U.S. Pat. No. 3,038,210, to Hungerford et al., and U.S. Pat. No. 3,222,432, to Grandperret, disclose methods and apparatus for thermally curing lens forming materials in mold cavities. Likewise, U.S. Pat. No. 4,758,448, to Sandvig et al. discloses a method for forming thin (0.5 to 50 microns), optically clear abrasion resistant coatings on optical surfaces.

Australian Patent Document No. 80556/87, to Squires, discloses a method of casting a layer of polymeric material onto the surface of a single-vision molded ophthalmic lens, which includes roughening the front surface of the single vision lens to enhance subsequent adhesion of the cast-on polymeric material, and removal of unwanted cylinder by placing a weight onto the periphery of a single-vision lens, resting in a mold of correct curvature. A small quantity of catalyzed monomer is placed between the single-vision lens and the mold, which are held in spaced relationship to one another by a jig, and the monomer is cured by either heat or UV radiation. Unwanted astigmatism is removed by subjecting the preform to a one-half kilogram load during curing, and, following curing, by separating the multifocal lens from the mold at about 60° C.

Prior art optical lens casting methods either require the use of a gasket surrounding a mold to retain the lens forming resin, or utilize a method and resin which is incapable of forming the full range of prescriptions required by opticians; in particular, the prior art does not disclose a resin or method of using same, which is suitable for forming high quality, aspheric or spherical single vision, multifocal, or progressive optics over a wide range of prescriptions and diameters in a fast, simple manner from a semi-finished or finished preformed optic.

Thus, there is a need for new resin formulations for use in casting of plastic optics and methods of forming plastic optics therefrom. In particular, there is a need for a fast and simple method for forming plastic optics which have a refractive index greater than or equal to 1.48 and abrasion or scratch resistance higher than 1.0 (as determined by a Bayer abrader and a hazemeter). There is also a need for an optical resin and method of using same for fast and easy formation of aspheric or spherical single vision, aspheric, multifocal, or progressive optics over a wide range of prescriptions from a finished or semi-finished blank or preform. Further, there is a need for a process which can utilize optical preforms of widely ranging size and/or shape which will be compatible with standard optic molds, and which will quickly form plastic lenses which will meet or exceed ANSI standards for ophthalmic lenses and/or which are optically functional and cosmetically acceptable.

OBJECTS OF THE INVENTION

Thus, it is a primary object of the present invention to provide a resin formulation which can be easily and quickly utilized to form high quality optics.

It is a further object of the present invention to provide a resin which can be easily and quickly utilized to form a wide range of finished single vision, multifocal or progressive optics from semi-finished or finished blanks, without requiring the use of gaskets or other restrictive apparatus for maintaining spacing between a mold and a preformed blank.

It is also an object of the present invention to provide a method and an apparatus to use with the method for forming hard plastics.

SUMMARY OF THE INVENTION

The aforementioned objects, and other objects of the present invention which will become apparent in the ensuing description, are achieved by the improved resin formulation of the present invention and methods for making and utilizing same to form optical lenses.

The resin formulations of the present invention may be used to cast plastic optics having a refractive index up to and greater than 1.48, and an abrasion resistance up to and higher than 1.0 in a Bayer abrader and hazemeter. The resin formulations of the present invention may be cast inside a mold assembly comprising a preformed optic and a mold to form a finished spherical or aspheric single vision, multifocal, or progressive optic in one step. A preferred casting process involves a thermally activated photochemical polymerization step, and utilizes a single apparatus, which dispenses precise amounts of resin into optical molds depending on the desired prescription, mold, and preformed blank, and provides for subjecting a mold assembly filled with resin to a carefully regulated amount of heat and actinic radiation sufficient to cure the resin and to form a finished single vision, spherical or aspheric, multifocal, or progressive optic.

It has been surprisingly discovered that, by use of the resin formulations of the present invention having a viscosity between 25 and 130 centistokes at 68° F., preferably between about 35 and 120 cst at 68° F., it is possible to form lenses of any prescription and base power without the use of a confining gasket during the casting process. Preferred resins are formed by mixing monomers of appropriate viscosities, or by adding solid or liquid high viscosity polymeric additives to a resin formulation which is otherwise optimal for molding optics or for casting resin onto a preformed blank. If polymeric additives are used to adjust the viscosity, cross-linking agents having a large number of reactive functionalities are used to create high cross-link densities to compensate for the decrease in overall cross-linking brought about by the polymeric additives.

A preferred casting process involves carefully relating the volume of polymerizable resin placed inside the cavity of a mold assembly formed between a preformed optic and a mold to the overall diameter of the preform, the radius of curvature of the mold and of the preformed optic, and the desired add power of any multifocal or progressive segment; thus, the volume of optical resin used will depend upon the added layer geometry to be added, which will depend on the mold and preform. Further, a preferred casting process adjusts for the changes in viscosity of the polymerizable resin due to (1) changes in temperature and (2) cross-linking of the resin; as temperature increases, viscosity decreases, and as the degree of cross-linking increases, the viscosity increases. In a preferred process, the polymerizable resin is initially cured at a low temperature, then this cure temperature is increased to offset the increase in viscosity due to cross-linking; insufficient viscosity will not provide for a sufficiently thick resin layer between the preformed optic and the mold in a mold assembly, while too high a viscosity will result in a decreased diffusion rate within the resin, resulting in less uniform curing and a slower cure rate, leading to the formation of undesirable wavy patterns and lower yields.

In a preferred embodiment, the quantity of resin required ranges between 0.30 and 8.0 ml to cast finished single vision, aspheric, multifocal, or progressive optics from preforms having spherical powers ranging from +6.00 diopters to −6.0 diopters (+6.00 D to −6.00 D), and cylinders, if necessary, up to 3.00 D, with appropriate add powers in the range of +1.00 D to +3.25 D. Preferably, a mold temperature profile is prepared, which specifies the mold assembly temperature (e.g., mold, preformed optic, and resin) at all times during the curing process and the resin is cured under the influence of actinic radiation, while conforming to the mold temperature profile; preferably ultraviolet radiation, having a wavelength between 320 and 400 nm, is used to cure the resin.

In order to obtain optimal yield of acceptable optics, it is critical that exposure to actinic radiation not begin until the mold assembly temperature is above about 80° F., but below about 130° F. Further, it is critical to obtain an optimal yield of acceptable optics that the temperature of the mold assembly during curing not exceed 180° F., otherwise delamination or cracking may occur with undesirable frequency. If the mold assembly is not raised to at least 165° F. during curing, an unacceptable amount of lenses will be too soft or insufficiently cured. Preferably, the mold assembly is exposed to actinic radiation when the mold assembly is at a temperature of about 115° F., and the temperature of the mold assembly is gradually increased while being exposed to actinic radiation to about 170° F.

In order to increase yields of quality optics, the resin is initially cured by exposure for brief intermittent periods of time to ultraviolet radiation, following a regular sequence of alternating dark and illuminated periods of time ("blinking").

In a preferred embodiment, finished ophthalmic lenses are formed in an apparatus which includes a curing chamber, where mold assemblies, comprising a mold, preform, and resin, are subjected to a carefully regulated temperature ramp combined with exposure to actinic radiation, preferably ultraviolet radiation. A preferred apparatus isolates the heating source from the actinic radiation source, so as to provide for improved efficiency in the generation of actinic radiation and prolong the life of the actinic radiation source; this also provides for improved control over application of heat and actinic radiation to the samples in the curing chamber. The preferred apparatus is also provided with a "chopper" which allows for intermittent or continuous exposure of the sample to actinic radiation; control of the temperature and exposure to actinic radiation is controlled by a microprocessor. In a preferred embodiment, the curing chamber provides for placement of a mold holding tray in the chamber, upon which rests one or more mold assemblies.

Preferred resin formulations include a base component, cross-linker, viscosity control agent, and initiator. Suitable base components are allylic derivatives, such as diethylene glycol bisallyl carbonate (such as that sold under the tradename CR-39 by PPG), and bisphenol A diallyl carbonate, and acrylates, such as methyl methacrylate, butyl methacrylate, propyl methacrylate, acrylic terminated glycidyl ethers, acrylic terminated esters, or acrylic terminated polyurethane oligomers derived from aliphatic isocyanates and aliphatic or alicyclic or aromatic hydroxy derivatives ranging in molecular weight from 800 to 5000.

Suitable cross-linkers include trifunctional acrylates, such as trimethylol propane triacrylate (TMPTA), tetrafunctional acrylates, such as pentaerythritol tetraacrylate (PTETA), and pentafunctional acrylates, such as dipentaerythritol pentaacrylate (DPEPA).

Suitable viscosity control agents include a co-polymer of methyl methacrylate and allyl methacrylate (such as Luchem from PPG), polymethyl methacrylate (PMMA) molding powder, and fine mesh silica or fumed silica (such as Cab-o-sil from Cabot). Fumed silica is particularly preferred since it is effective in controlling viscosity, enhances the optical clarity and transparency of the resultant optic, and leads to improved scratch resistance. The silica particles may be given one or more surface treatments prior to use, e.g., silanation, comprising treatment of silica particles with a silane derivative.

In certain embodiments, it is desired to use a mold release agent. Preferred mold release agents include acrylic terminated siloxanes or perfluoralkyl derivatives having low polymerization reactivity (such as a perfluoroalkyl sulfonamide methacrylate known as FX-13, available from 3M Corporation); these agents are believed to migrate to the surface of the mold during polymerization, providing mold release properties to the resultant optics. The addition of mold release agents may alter viscosity; addition of the preferred mold release agents can lead to an increase in viscosity, thus reducing the required quantity of viscosity control agent needed to obtain a desired viscosity of the resulting unpolymerized resin. The preferred mold release agents are believed to develop a surface which is resistant to adhesion of dust or soil particles to the optic.

Preferred photoinitiators include aromatic ketones, such as 2-hydroxy-2-methyl-1-phenyl-propan-1-one (sold as Darocur 1173 by EM Industries, Inc.), and 1-hydroxycyclohexyl phenyl ketone (sold as Irgacure 184 by Ciba Geigy).

Preferred resin compositions are readily photocured in 30 minutes or less when cast onto the surface of a preformed optic blank. Acrylic-based components, which have a higher polymerization activity, can be photocured in five minutes or less when used to cast a prescription onto a preformed blank.

The resins of the present invention are preferably cured by careful control of the intensity of the curing radiation and temperature of the curing assembly throughout the cure process, and by control of the concentration of oxygen and polymerization inhibitors in the system.

In an alternate embodiment, improved results are achieved by developing a non-uniform polymerization profile throughout a layer of resin cast onto a finished or semi-finished blank (in contrast to the accepted prior art practice of uniformly photocuring thin and thick resin layers).

Thus, the present invention provides a method for casting of spherical or aspheric single vision, multifocal, or progressive optics for ophthalmic lenses, and in a preferred embodiment (1) uses a spherical or aspheric optical preform and a mold made of glass or any other material capable of transmitting or reflecting UV radiation between 320–400 nm, (2) uses a specified volume of a photocurable resin system having a viscosity or density sufficient to support an optical preform above a mold, such that a gasket or other apparatus is not needed to maintain the correct spaced relationship between the preform and the mold, and (3) can form spherical or aspherical optics incorporating refractive corrections, such as monofocal, multifocal, or progressive optics with all types of power contours, astigmatism and optical prism, all of which may be prescribed either alone or in combination.

The present invention will be better understood from the following detailed description.

BRIEF DESCRIPTION OF THE DRAWINGS

FIG. 10 is a perspective cross-sectional, partially cut away, view of a curing apparatus for use in performing the present invention.

FIG. 11 is a mold temperature profile for achieving optimal results using the process of the present invention.

DETAILED DESCRIPTION OF THE INVENTION

Figure 1:
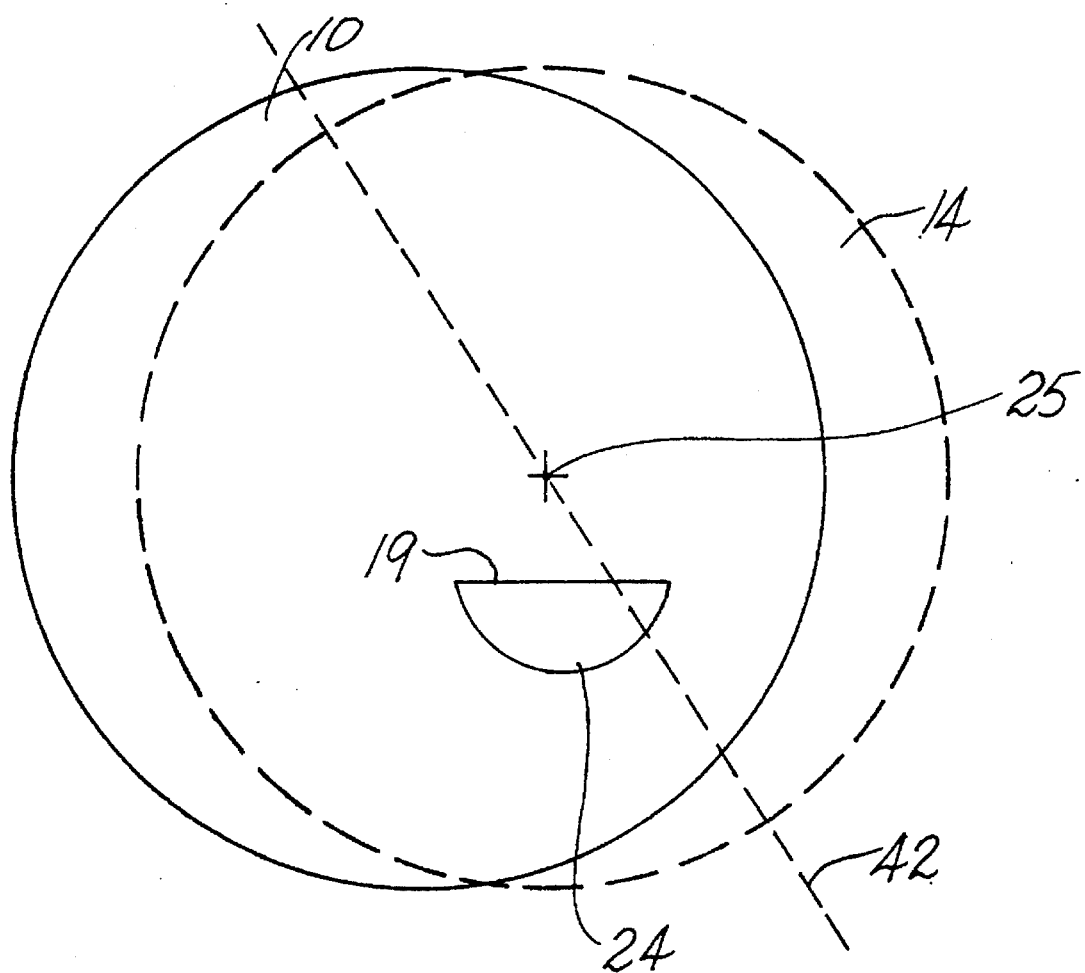
FIG. 1 is a top plan view of a mold and a preformed lens (in dashed lines) showing physical displacement of the optical center (indicated by a "+" sign) of the preformed lens with respect to the mold portion corresponding to an optical segment, and also showing the astigmatic axis (indicated by dashed line 42) fixed for a specific prescription.

In-office lens casting, which requires use of optical gaskets is very demanding with regard to the number of different conventional optical gaskets needed and the inventory necessary to produce different finished lens prescriptions. In one such system, hundreds of conventional optical gaskets must be maintained in inventory and constantly replaced (after one use) to allow production of all prescriptions. Further, several hundred expensive back molds are required to match each gasket. Approximately 200 "optical center movers" (OCMs) must also be inventoried to relocate or decenter the optical center. These OCMs are also not reusable and must be constantly replaced. The need to maintain and replace this varied inventory of conventional optical gaskets and OCMs contributes significantly to the cost of lens casting. In the case of in-office lens casting, these components can account for approximately 32% of the materials cost of casting a lens using such a system.

By casting aspheric curves, optical segments, or other multifocal or progressive regions on the surface of a preformed lens, a wide variety of lens designs can be achieved quickly and inexpensively. Such a method decreases the large number of different mold combinations usually needed to cast multifocal and progressive lenses. Also it eliminates the large, expensive and cumbersome number of conventional optical gaskets and optical center movers, OCMs, customarily used in in-office lens casting. In most instances, the lenses produced according to the invention also do not require additional surfacing to achieve the proper prescription and can eliminate the additional step of surfacing prism into the finished lens to relocate, the optical center. The methods of the present invention allow production of spherical or aspheric single vision, bifocal, multifocal, and progressive from previously formed prescription lenses. In essence, the preformed lens serves as a mold which is consumed during the casting process and forms a part of the finished lens.

It should also be noted that the preformed lens and mold used in practicing the various embodiments of the present invention need not have the same base curve; thus, it is possible to form lenses having thicker edges or centers (i.e., plus and minus power lenses or lens corrections).

The methods of the present invention can also be used to convert preformed spherical single vision, multifocal or progressive lenses into aspheric lenses by adding material to the lens surface. In such embodiments, the cavity formed by the preformed lens and the molds corresponds to the desired shape of the surface needed to create the aspheric effect.

In contrast with traditional lens casting methods, the methods of the present invention provide lenses relatively quickly and at significantly less cost. Using the methods disclosed herein curing with heat and ultraviolet light requires approximately 30 minutes, and no surfacing is required. Thus, the present invention provides means for producing ophthalmic quality spherical or aspheric, multifocal, and progressive lenses in approximately 1 hour or less, starting with liquid resin and ending with the finished lens in the frame. This allows delivery of prescription lenses upon request and without having the patient wait a significant time.

A preferred method for making a finished lens having an spherical or aspheric, multifocal, or progressive region utilizes a mold assembly, having a mold, an optical quality resin composition, and a preformed plastic lens having a predetermined lens correction at its optical center, and, in some cases, a semifinished preform is used which has no power. The preformed lens in combination with the mold forms a cavity for enclosing and shaping the resin composition. The resin is then cured and forms a shape corresponding to the shape of the cavity.

The finished optical lenses made in accordance with such methods provide a first lens correction, for example at their optical centers, and may have a second region removed from the optical center (i.e., the multifocal or progressive region) which provides a second lens correction A method is also provided for forming such a multifocal lens in multiple stages. A preformed lens is first cast as described above to provide an intermediate lens having an intermediate lens correction at the second region, the magnitude of which is between the magnitudes of the first lens correction and the second lens correction. The intermediate lens is then .cast again as described to provide a lens curvature at the second region corresponding to the second lens correction (and a carrier, if used).

Lenses made in accordance with another embodiment the present invention are also disclosed in which addition of a multifocal optical segment creates a beneficial positive transition in the finished lens. Such lenses provide at least a third lens correction and a fourth lens correction. The third lens correction is provided by a third region adjacent to the optical segment and is located between the optical center of the preformed lens and the center of the segment. The fourth lens correction is provided by a fourth region within the segment and is located between the optical center of the preformed lens and the center of the segment. As described further below, the magnitude of the third lens correction is between the magnitudes of the first lens correction and the fourth lens correction; and the magnitude of the fourth lens correction is between the magnitudes of the second lens correction and the third lens correction, such that a gradual discontinuous change in prescription is provided. This phenomenon has been observed mainly in connection with addition of a flat top optical segment.

The methods of the present invention can be used to add a multifocal or progressive region to a front lens surface, a back lens surface or both. Preferably, the curvature of the lens is changed over only a portion of a surface of the preformed lens to form an "optical segment". The methods of the present invention can be used to form lenses of almost any multifocal or progressive optical configuration including without limitation aspheric, bifocals, trifocals and progressive lenses. When a multifocal or progressive lens is produced, the preformed lens can be treated in accordance with the invention to provide an optical segment providing a second lens correction (e. g., bifocal), a third lens correction (e.g., trifocal), etc., each of which is different from the distance lens correction of the preformed lens (i.e., at its optical center). In such embodiments the mold is fashioned to correspond to the desired shape of the aspheric, multifocal, or progressive region of the resulting lens and any carrier layer, if used. The disclosed methods can .also be used to change the power on portions of the preformed lens, to create prism, and to produce multifocal or progressive lenses from preformed lenses.

The methods of the present invention are useful with respect to any preformed "plastic" optical lens regardless of the manner in which such lens was formed. As used herein a "plastic" lens is one fashioned from optical quality resin materials.

Although optical segments can be placed in any location on the lens, for normal applications, the optical segment should be properly located to avoid adverse prismatic effects. Optimally, an optical segment should be positioned approximately 1.5 mm left or right and 3–5 mm down from the optical center of the lens for normal eyeglasses. In certain applications, such as workman's glasses for close vision above the wearer's head, the optical segment can be optimally located approximately 1.5 mm left or right and 3–5 mm above the optical center of the lens. Other locations of the optical segment can also be used as long as the optical center and the segment are properly aligned.

The methods of the present invention can also be for properly orienting the optical center of the lens with respect to the multifocal or progressive region. Also they can be used to cast compensating base-down prism in conjunction with casting a progressive lens. Appropriate lens designs providing prismatic effects will be apparent to those skilled in the art. Where creating prism is desired, the casting mold is configured and positioned with respect to the preformed lens to provide the required additional thickness in the resulting lens. The mold and the preformed lens may be properly oriented by spacers which provide the desired separation, corresponding to the required thickness for inducing the prismatic effects sought. Such spacers can take any form, including wedges, and can be fashioned from any suitable material.

The optical center can be moved or displaced, as shown in FIG. 1, by physically moving the optical center 25 of preformed lens 14 to align with the desired location just above the edge (or ledge) 19 of the multifocal region 24 in the case of a multifocal lens or to the proper mold position in the case of a progressive lens, then casting the new lens surface. Since the method of the present invention does not employ a conventional optical gasket, such dislocation of the preformed lens with respect to the mold is possible. Conventional methods employing a conventional optical gasket make such dislocation virtually impossible because the conventional optical gasket will not allow movement of the lens with respect to the mold. It should also be noted that, when dislocating the preformed lens in relation to the mold as just described, more useful lens cut out area can be produced by increasing the size of the mold and the preformed lens as well as decentering the preform with respect to the mold, thus producing a larger useable finished lens surface. However, either the preformed lens or the mold can be the larger in size to achieve the desired displacement or decentration, or the preformed lens and the mold can be the same size and simply moved relative to each other.

In some lens designs, adjustments must be made to accommodate astigmatism in the prescription of the finished resulting lens. In such cases, the preformed lens and mold must be rotated with respect to each other to a degree corresponding to the proper astigmatic axis. The preformed lens and mold can either be contacted at the proper angle or can be rotated with respect to each other after contact. The mold and/or preformed lens can optionally be provided with appropriate markings (e.g., protractor lines) for determining the proper astigmatic axis.

Figure 2:
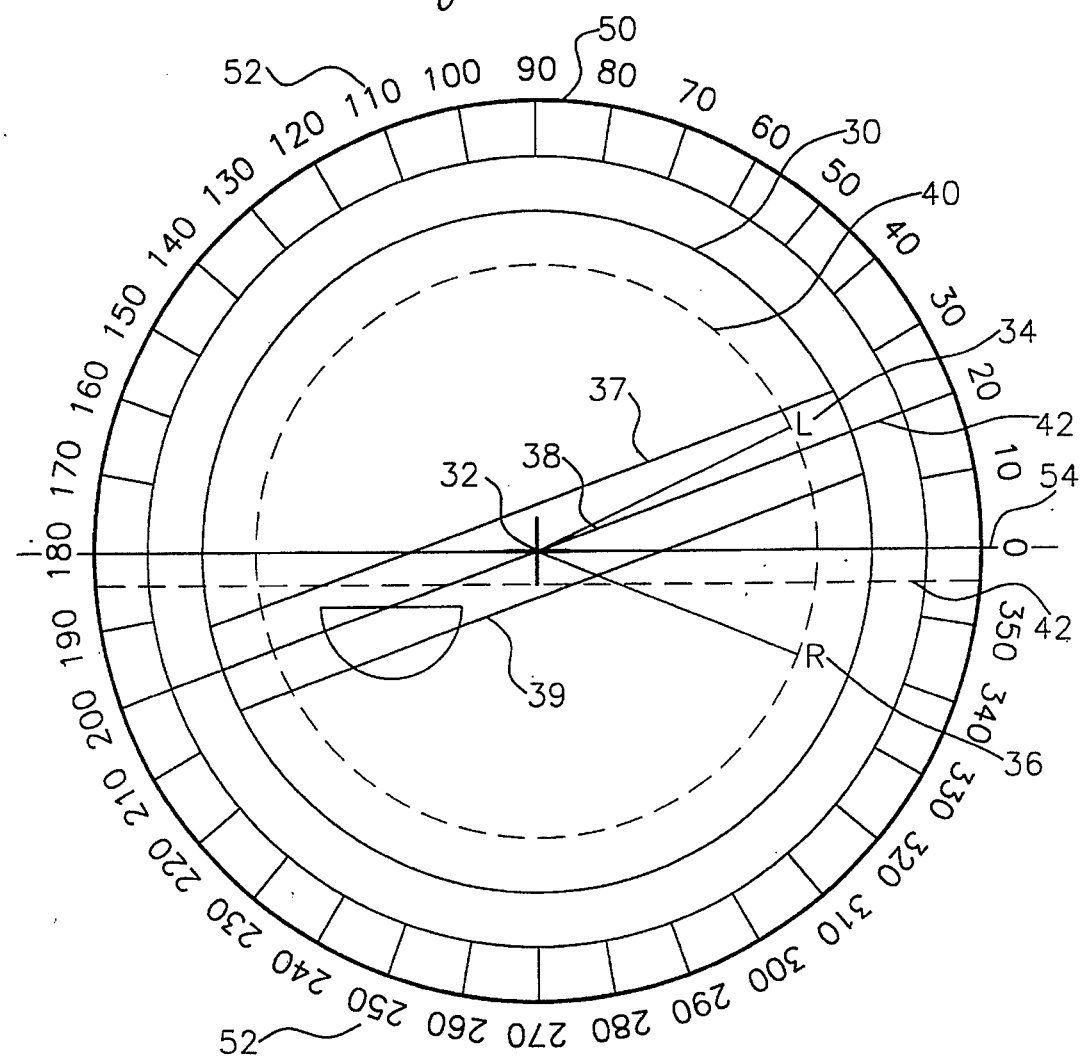
FIG. 2 is a top plan view of a mold and a preformed lens (dotted line) centered above a protractor.

Alternatively, the mold and preformed lens can be assembled while situated above a circular protractor such as that shown in FIG. 2, which serves to align the astigmatic axis, etc. FIG. 2 is a top view of a mold assembly centered over a circular protractor. Mold 30 may rest in a mold holder or mold holding tray, such as that shown in FIGS. 7, 8, and 9. Preform 40 is floated on resin in mold 30. The protractor 50 has angle demarcations 52, and also has a point, not visible in FIG. 2, at it's center, which is aligned with the geometric and/or optical center of the mold, which is indicated by a cross 32 etched in the center of the bottom of the mold (e.g., the surface opposite from the molding surface of mold 30). The protractor also has an "L" 34 and an "R" 36 denoting the proper alignment of the mold in relation to the preform for molding a progressive lens for the left and right eye, respectively, which would be aligned beneath a corresponding "L" and "R" etched on the bottom of mold 30, if mold 30 was a centered progressive mold (note that mold 30 is not a progressive mold for this example, but rather a flattop bifocal mold). (Note that the preform, the resin (not visible in FIG. 2), and the mold are transparent.) Lines 37, 38, and 39 are provided for reference only, and are not present in a normal mold assembly according to the present invention. In aligning the astigmatic axis of the preform with respect to the mold, indicator marks on the periphery of the preform (which indicate the astigmatic axis of the preform) are rotated with respect to the axis 54 of the protractor to obtain the correct astigmatic correction in the finished lens. The astigmatic axis of the preform is represented by line 42 (line 42 is not visible on actual preform).

In casting a multifocal segment containing layer onto a preform, it is important to properly orient the optical center, the multifocal region and the astigmatic axis of the finished lens with respect to each other. This can be achieved by combining the methods described above for inducing prismatic effects and for aligning the astigmatic axis. In another embodiment, a preform is placed in a lensometer, rotated to the correct axis, and indicator markings are placed on the preform, which are then used to properly orient the preform with respect to markings on the mold.

Figure 3:
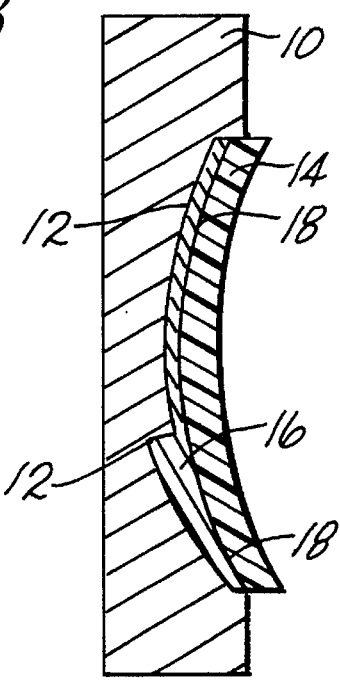
FIG. 3 is a cross sectional view of a mold assembly constructed in accordance with the present invention.
Figure 4:
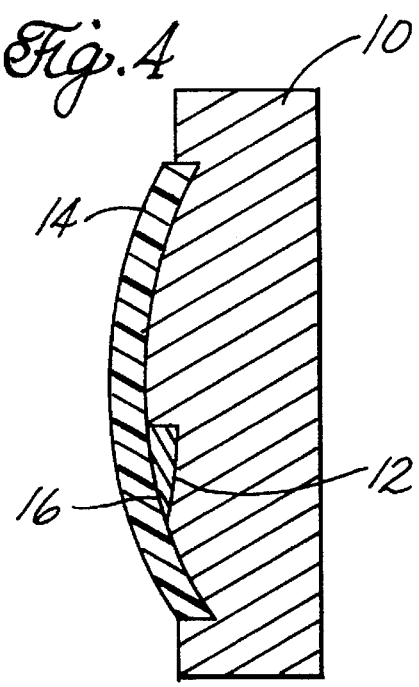
FIG. 4 is a cross sectional view of a mold assembly for casting a layer onto the convex side of a lens in accordance with the present invention.

Generally, the preformed lens is transformed by casting a layer of optical quality resin material on at least a portion of the preformed lens surface. As shown in FIG. 3, the contours of the casting are determined by mold 10. Mold 10 is shaped such that the cavity 12 formed between lens 14 and mold 10 corresponds to the desired change in curvature of the lens, including the multifocal or progressive region (e.g., optical segment 16) and non-prescription carrier layer 18, if used. Similarly, as shown in FIG. 4, mold 10 can be fashioned such that the cavity 12 defines a new structure on the back surface of the preformed lens 14 such that the surface is changed to provide the desired lens design.

Figure 5:
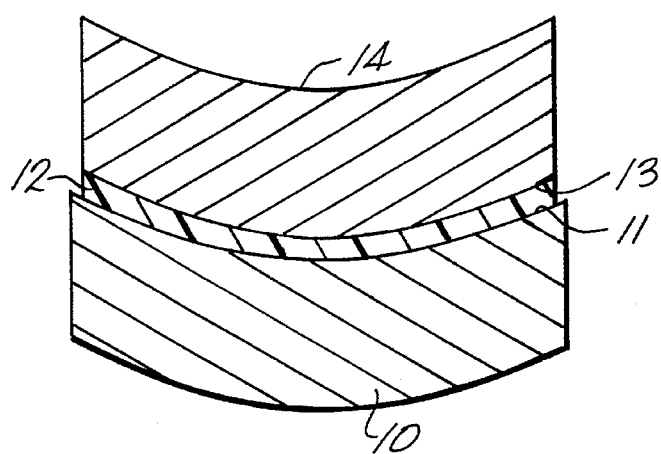
FIG. 5 is a cross-sectional view of a mold assembly constructed in accordance with the present invention for forming a negative lens correction.

With reference to FIG. 5, mold 10 may have a molding surface 11 which has a different radius of curvature than casting surface 13 of lens 14. Thus, cavity 12, when filled with resin, will produce a layer which is thicker at it's periphery than at it's center (a minus power correction).

Figure 6:
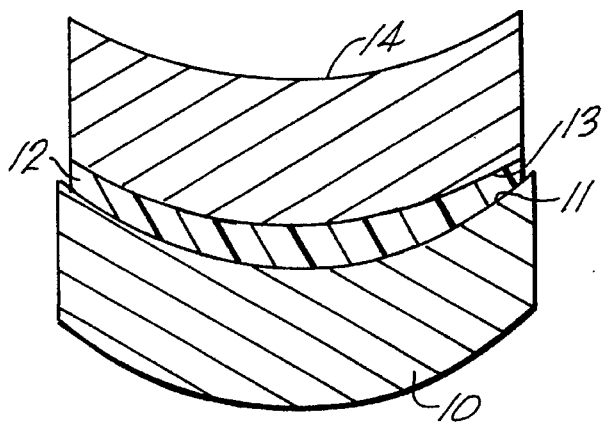
FIG. 6 is a cross-sectional view of a mold assembly constructed in accordance with the present invention having a positive lens correction.

With respect to FIG. 6, mold 10 has a molding surface 11, which has a greater radius of curvature than casting surface 13 on lens 14 so that cavity 12, when filled with resin, will produce a positive lens correction (e.g., a lens being thicker at it's center than at it's periphery).

Molds can be made from any material which will provide an optical quality surface when used for casting and will transmit or reflect UV radiation, such as, but not limited to, Crown glass or metal. Means for making appropriate molds and for fashioning such molds for use in accordance with the present invention are known in the art.

To cast the new lens surface, an optical resin monomer material is dispensed onto the mold, the preform "floated" or carefully positioned over/on the resin layer so as to avoid generating bubbles in the liquid, and then exposing the mold assembly formed to curing conditions of heat and actinic radiation.

Certain materials used to "hardcoat" lenses (such as those described in U.S. Pat. Nos. 4,758,448 and 4,544,572, which are incorporated herein by reference) may be used on the surface of the lenses or can be blended with other resins for use in practicing the present invention. Furthermore, the resultant lens can be a composite of high index plastic materials and more scratch resistant materials.

It has been found that fumed or fine mesh silica serves as a viscosity control agent, and also enhances the scratch resistance of an optic upon the surface of which is cast a layer containing a plastic concluding the silica. The maximum concentration of silica which can be incorporated into the resin, without causing haze or milkiness in the finished optic, depends on the surface chemical composition of the silica (or glass) particles. Fumed silica has a surface layer rich in hydroxyl groups, hence it's surface is hydrophilic; the maximum concentration of fumed silica in a hydrophobic resin formulation (such as one containing 92% by weight DEG-BAC, 5% by weight PTETA, and 3% by weight IRGACURE 1173) is 3.5%, and preferably no more than 3.0% by weight. Treatment with a reactive silane derivative renders the surface of fine mesh silica hydrophobic; therefore, more than 3% by weight silica can be incorporated in this resin formulation to form a homogenous mixture. Similarly, other surface treatments, such as, but not limited to, treatment with an aminosilane, may be used for optimum properties. The resin material should, however, be chosen such that, upon curing, the material will both harden and bond with the material of the preformed surface of the lens.

In preferred embodiments, both the preformed lens and the resin material used to recast the lens surface are the same or similar material. Use of the same or similar materials prevents separation or "crazing" (i.e., cracking) of the new surface from the preformed lens as a result of different expansion/contraction rates for the preformed lens and recasting materials. Applicant also believes that use of the same or similar materials may allow formation of intermolecular bonds between the new resin and the surface of the preformed lens.

Coatings can also be provided to the resultant lens by transferring coatings from the mold to the resultant lens. In such embodiments, the mold is first coated with the material to be transferred to the lens, such as anti-scratch, anti-reflective, photosensitive or hard coatings. The coated mold is then employed as described herein. If the coating material has a greater affinity for the lens resin material than for the mold surface, the coating will be transferred to the surface of the resultant lens. Suitable materials and means for applying them are known in the art, including without limitation those disclosed in U.S. Pat. Nos. 4,758,448 and 4,544,572.

Ultraviolet curing allows use of tinting agents in the resin composition which would be decomposed or volatilized during thermal curing processes. If UV curing is used, tinting agents may be added to the resin composition before curing and incorporated relatively uniformly into the resulting finished lens. Since in some cases significant heat does not need to be employed in the UV curing process the tinting agent is retained by the resin material during the curing process. This is accomplished because no peroxide-based thermal initiator is used therein. However, in a preferred embodiment, tinting is performed after the lens is cured.

The preformed lens and mold may be separated by spacers which maintain a desired separation between the lens and the mold, thus providing a recast surface of a desired thickness.

Any suitable material, for example, small pieces of tape, can be located between the lens and mold at various points around the periphery of the lens/mold assembly. Using carpet tape provides a surface approximately 0.4 mm thick, while use of scotch tape provides a surface 0.2–0.3 mm thick. Spacers can also be constructed from material that is the same as or similar to the preformed lens and/or the resin composition. Upon curing, such a spacer could become incorporated into the finished resulting lens. Such layers cast in accordance with the present invention have been measured as thin as 0.025–0.05 mm thick.

Once the mold and the preformed lens are assembled, the resin material in the resulting cavity must be cured to harden and bond with the preformed lens surface. The resin material may be cured in any manner appropriate to the composition of such material.

Figure 7:
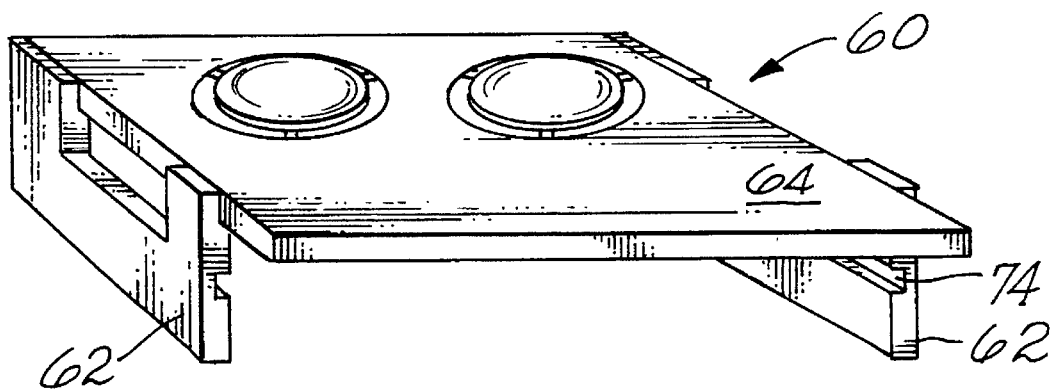
FIG. 7 is a perspective view of a mold holding tray for holding mold assemblies in accordance with the present invention.
Figure 8:
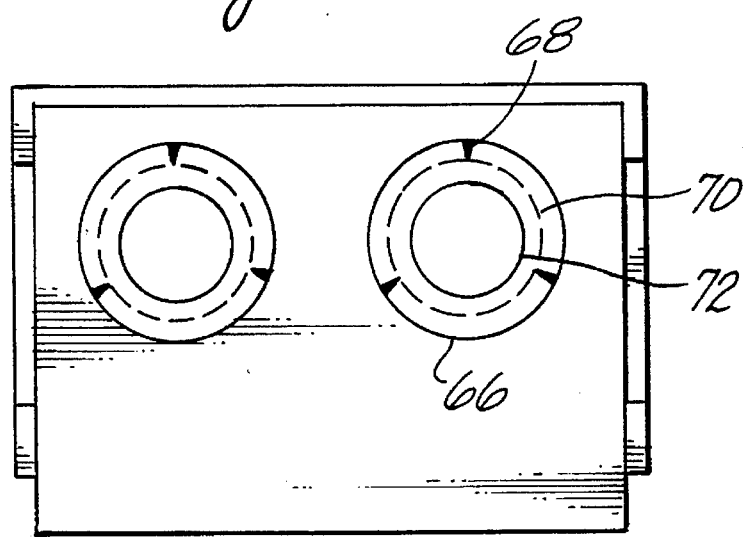
FIG. 8 is a top plan view of the mold tray of FIG. 7.

With reference to FIGS. 7 and 8, a mold holding tray 60 is illustrated. Tray 60 is formed of supports 62 and platform 64; openings 66 are provided in platform 64. Although two openings 66 are shown in FIGS. 7 and 8, a larger tray may be used, having a greater number of openings 66. Movable fingers 68 are provided at the periphery of opening 66. In a preferred embodiment, three fingers 68 are equidistantly spaced about the periphery of opening 66 and project sufficiently far into opening 66 to support a mold assembly, which is formed of a mold 70 having a preform 72 floating on resin on the molding surface of mold 70. With reference to FIG. 7, note that supports 62 have opposed U-shaped slots 74. In a preferred embodiment, a rectangular card having a length and width substantially equal to that of platform 64 can be inserted into opposed slot 74. Upon the inserted card are protractor designs which are aligned with openings 66, so that preforms 72 can be aligned properly with molds 70. After aligning the preforms with the molds, the protractor card can be removed and the entire tray 60, or just platform 64, can be inserted into a curing chamber, such as that shown in FIG. 10. Note that fingers 68 can be adjusted to situate a mold 70 at an angle in order to create, for example, prism.

Figure 9:
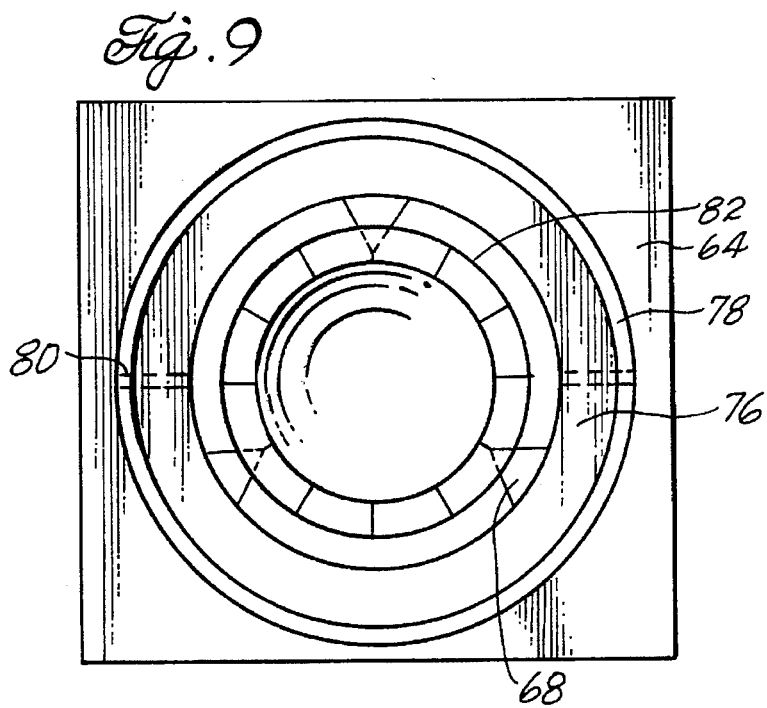
FIG. 9 is a top plan view of an alternative embodiment of a mold holding platform.

In an alternate embodiment shown in FIG. 9, a mold holding platform 64 has annular ring 76 which is supported in opening 78 by pins 80. Fingers 68 are fixed in annular ring 76, and support a mold assembly 82.

Annular ring 76 is rotatably mounted by two pins projecting from opposed sides of opening 66, which allows points on the mold periphery to be vertically displaced with respect to one another; this is especially useful to compensate for any shifting tendency of a preform which has its geometric center displaced with respect to the geometric center of the molding surface in a mold. In other words, aligning the optical center of a preform with a corrective segment in a mold may cause the preform to tip or rock at an angle from horizontal; when the preform is contacted with resin in a mold, and is at an angle, tipping of the mold can cancel any tendency of the preform to shift with respect to the mold.

With regard to FIG. 10, a cross-sectional, partially cutaway perspective view of a preferred curing chamber is presented. Top and bottom walls 80 and 82, respectively meet side walls 84 and 86 respectively at opposed edges. The parallel edges of walls 80, 82, 84, and 86 meet a back wall 88 to define an enclosure. A door or cover (not shown) is provided in a preferred embodiment to completely surround the enclosure. Horizontal dividing walls 90 and 92 create a curing chamber 94 therebetween. Dividing walls 90 and 92 are formed of an opaque material, which does not allow transmission of actinic radiation into chamber 94. However, dividing walls 90 and 92 are provided with openings or windows 96, which preferably are covered with a material transparent to actinic radiation. Separate chambers 98 and 100 are formed between dividing wall 90 and wall 80 and between dividing wall 92 and wall 82, respectively. Chambers 98 and 100 include actinic radiation or UV radiation sources 102 and choppers 104. Choppers 104 are driven by a mechanism (not shown), which is preferably controlled by a microprocessor. Choppers 104 include a disk 106 having a UV transparent portion 108 and opaque portions 110. Once opaque portions 110 are aligned with openings 96, actinic radiation cannot pass through openings 96 into chamber 94. A fan 112 is situated in chamber 94 to circulate air. A separate heating element (not shown) heats chamber 94, with chambers 98 and 100 being substantially insulated from chamber 94. Chamber 98 and 100 may be cooled by provision of a fan or other cooling means; vents may be situated at various locations in the apparatus to facilitate heat control. Situated on a platform 60 in chamber 94 are two mold assemblies supported in openings 66 in platform 60. Thus, mold assemblies resting in openings 66 of platform 60 can be exposed to actinic radiation passing through windows 96, so that both the top and bottom of the molds are subjected to actinic radiation. Further, by heating chamber 94, each mold apparatus can be simultaneously subjected to controlled heat and actinic radiation.

UV light sources 102 can be any source which provide ultraviolet radiation in the wavelength range 300–450 nm, preferably in the range 360–460 nm. Criteria for selection of preferred UV sources are: 1) Fraction of total energy output falling in the preferred wavelength range, 2) stability of UV output as a function of number of hours of use and temperature, and 3) life expectancy of the bulbs.

Non-limiting examples of UV light sources include those manufactured by Phillips Corporation and identified as TL/10R/UVA reflector lamps, HPM high pressure halide lamps, HPA medium pressure metal halide lamps and HPR high pressure mercury vapor lamps; a preferred source is a Phillips PL-S-9W/10 lamp. In preferred embodiments, the UV source (300–450 nm) is applied during the curing process until the resin hardens sufficiently (approximately 30 minutes), and preferably the UV source includes elongated tubular bulbs. In some cases, the lenses to be cured are placed onto a turntable for rotating the lenses through the stream of incident radiation in order to achieve more even curing and maximizing the number of lenses which can be cast within a given area, while minimizing the number of UV sources. Other appropriate UV light sources and conditions for exposure will depend upon the resin composition employed and will be apparent to those skilled in the art.

Curing can also be performed using a "blinking" UV light source. Curing with a blinking source tends to slow and control the reaction in the early stages and produces an optical segment with less variation in consistency.

Heat or UV, or both, may be applied by any means appropriate to the material from which the mold and preformed lens are made. Unlike thermal curing, UV curing requires at least one UV transparent surface through which the UV radiation can travel to reach the resin monomer material. Although the preformed lens provides one transparent surface, forming the mold from a UV-transmitting material will provide additional transparent surfaces and will promote faster, more even curing. Upon application of heat and actinic radiation, either a combination of thermal and photochemical initiators or a photoinitiator used by itself cause the optical resin material to polymerize onto the surface of the preformed lens.

Certain embodiments of the present invention use a reflective surface on the surface of the mold to reflect ultraviolet light back through the lens resin material being cured. The mold includes a reflective surface conformed to the casting surface of the mold. The exposed surface of the reflective surface is highly polished to reflect ultraviolet light rays from an ultraviolet light source. The reflective surface may act directly as a molding surface that produces an optical quality lens surface or may be fixed beneath the molding surface.

Preferred resin compositions for use with such a combined thermal/UV curing process comprise a resin formulation including DEG-BAC or HIRI-II and 1–8% by volume of at least one photosensitive initiator, such as, but not limited to, aromatic ketones, such as 2-hydroxy-2-methylphenylpropan-1-one or 1-hydroxycyclohexyl phenyl ketone, which are sensitive to ultraviolet light (the term "aromatic ketones" is used herein to describe only those aromatic ketones which will act as suitable photoinitiators for the subject invention). Other resins may include allyl diglycol carbonates, allylic esters, acrylic esters, acrylates, methyl methacrylate, allyl methacrylate, butyl methacrylate, polycarbonates, urethanes, and epoxies.

Particularly for lens manufacturing processes using UV curing, a yellow tint may remain in the resulting lens or may evolve during aging. This tinting or "yellowing" can be reduced by curing the lens material with the addition of certain anti-yellowing chemical agents. These include amine hindered amine light stabilizers (HALS), optical brighteners, and hindered phenol antioxidants.

It has also been found that inadvertent post curing and additional yellowing or discoloration can occur after a lens has been cured by permitting the lens to be subjected to a UV curing process longer than desired or inadvertently exposing the lens to sunlight or artificial light, which includes wavelengths of the UV spectrum, during processing or use. Additional exposure to UV light produces a continued curing effect because of the remaining UV initiator in the formed plastic lens. This can cause the lens to be unduly brittle and cosmetically discolored, permitting it to be readily fractured and detracting from the normal life or commercial sale of the lens.

The invention described herein can include the use of UV inhibitors coated on the surface of the cured lens or absorbed into the surface of the cured lens to avoid any additional effect on the UV initiators and to substantially prevent or entirely eliminate the transmission of UV light waves into the lens. Such processes are further described in co-pending U.S. patent application Ser. No. 339,217, filed Apr. 17, 1989. This coating can take the form of anti-reflective coating, a scratch-resistant coating, any tinting coatings, or simple wavelength coating which could be basically clear for preventing UV wavelengths from being transmitted. Such UV inhibitors are well known in the art and need not be described in detail herein. It is desirable to have the UV inhibitor eliminate all UV light and other wavelengths having a wavelength of 450 nm or less and more specifically between 300–425 nm.

This treatment process normally involves, after the curing steps, simply dipping the cured lenses into a hot bath having any one of the coatings mentioned above to coat the surfaces sufficiently such that the entire surface of the lens is covered with the inhibitor. This dipping process, as well as other processes for applying the coatings noted above are well known to those skilled in the art. The UV inhibitor can be used in solution or otherwise form a composition with the coatings discussed above, such that the desired coating along with the inhibitor can be applied to the lens in a one step process. Some inhibitor may be absorbed into the lens material. Other known methods of coating can be used in applying the UV inhibitor in the manner described above.

Prior to lens surface treatment, if any additional hardening is required, the lens can be subjected to "post curing". Preferably for post curing, after the thermal and/or UV cure, the lens is separated from the mold and subjected directly to UV or heat. This post cure using UV and or a thermal source will harden the lens material even further should such additional hardness be required. Thermally annealing at approximately 185° F. for two to five minutes causes beneficial surface relaxation effects which reduce surface irregularities.

The recasting method can be used to correct other defects in rejected or damaged cast lenses. A defective lens can be recast with a thin non-prescription film layer using a mold of the same shape to remove the defects, thus decreasing yield losses during the manufacturing process. Recasting according to this method can be cured in any appropriate manner in far less time than the initial casting due to the thin film layer to be cured. Furthermore, significant savings can be accomplished due to use of less resin material and, elimination of the need for a conventional optical gasket.

It has been found that, if one first cures the surface closest to the mold-resin interface, a surface layer with an advanced level of cure will be established. This partially cured optical crust or shell assumes a structural skin that, upon deeper curing, maintains and resists mold resin interface curvature changes caused by uneven shrinkage. This shrinkage occurs largely in the matrix between the surface of the mold resin interface and the preform resin interface. By establishing this external optical shell or layer of enhanced cure, curing layers of uneven thickness added to a preform can be accomplished with minimal surface astigmatism or irregularity.

The surface layer can be formed using a number of techniques, for example, by controlling the light source or light sources which produce different wavelengths or intensities of UV light, use of inhibitors, initiators and various combinations thereof.

This feature of surface curing can be enhanced or controlled by additives to the resin which inhibit UV light. Thus, whether different intensity or different wavelengths are chosen, the inhibitors facilitate the surface being initially cured, impeding the curing of the resin beneath. Additional curing of the resin beneath the surface will not occur until the intensity, wavelength, or time of UV light is changed accordingly to pass through the surface and overcome the effect of the inhibitors.

A similar effect can be accomplished by utilizing a high level of a photoreactive initiator which purposely will slow the reaction in the bulk. This high level of initiator will cause high excitation of the surface due to the initiator concentration at the surface. By its very nature it will cause the surface to cure first and the deeper areas later with time and continued light exposure.

Another similar effect can be accomplished by any combination of the previous mentioned examples so long as the optical crust or shell is established first before curing deeper layers.

Once properly cured, the new surface added to the lens in this manner can be annealed in an air oven or by submerging it in a hot liquid bath.

Curing a resin cast on the surface of a preform by using heat in combination with UV light has been found to have several beneficial effects. It enhances bonding between the thin film and the preformed lens. The heat in combination with UV apparently increases molecular activity causing better interaction at the film lens interface. This makes it more likely that bonding will be more uniform across the entire surface of the lens. Enhanced bonding is believed to be due in part to the enlargement of the voids which pervade the surface of a plastic lens at the microscopic level; by increasing the resin temperature, the resin has a greater chance to fill these voids, thereby enhancing the bonding between the two elements. Furthermore, higher temperatures are believed to keep the resin molecules and polymeric chains more mobile on the external surface closest to the mold, thus providing for a more optically pure surface, more consistent in uniformity, regularity of curvature, and a higher scratch resistance.

Often, during curing, the lens blank or preformed lens with the mold is rotated in an effort to facilitate curing throughout the lens. However, even this approach can produce uneven curing. It has been found that oscillation can result in better curing, particularly at the lens center. With rotation, the lens center may be relatively stagnant, resulting in greater hardness at the center than elsewhere. Oscillation avoids this stagnation since the lens center will move with the rest of the lens, thereby avoiding undue disproportionate curing. Such oscillation can be used with rotation or independently thereof.

It has been found, moreover, that, with certain prescriptions, the preformed lens may have a curvature on its convex surface that is somewhat different from that of the lens curvature at its distance correction (see FIGS. 5 and 6).

In using systems for manufacturing lenses by way of conventional surfacing, surface casting of thin layers can be used. For example, in a system where the semifinished or finished lens blanks are either injection molded or cast, typically the front portion of the lens can have a surface with a known power or curvature with the rear surface being blank or not of ophthalmic quality. The mold utilized has a desired curvature for the front surface of the lens. In the preferred embodiment the curvature allows for a multifocal progressive or aspheric front surface. The resin is placed into the mold, and the finished or semifinished lens blank (having been molded by an injection molding process or cast) is then placed on the resin such that the resin is drawn and/or forced throughout the space or cavity between the mold surface and the lens surface. Once in this position, the system is then cured until the resin is hardened sufficiently. Then the lens blank is removed with the resin being cured onto the surface, having an outer surface corresponding to the curvature of the mold.

With this lens blank, all the prescriber need do is, once a prescription has been determined, simply finish the lens back by standard surfacing steps which include grinding and polishing the back surface to the desired curvature. No further effort is required on the front surface since the molding process produces for the surface a lens of optical quality. Once the lens is finished to desired power and optical quality, it can then be edged and placed into the frame selected by the user. With this system it is much more economical to manufacture, prescribe, and sell lens of optical quality than many systems had utilized before, since it offers a fast, easy efficient and economical method to fabricate lenses or plain blanks without the need to maintain a large inventory of different styles, and semifinished lens blanks.

It has been discovered that resins of higher index of refraction added to the front surface reduce multifocal ledge surface curves and overall finished lens thickness. It has been found that, by using a resin of a higher index of refraction than that of the single vision lens back, the multifocal shelf thickness in the case of a lined multifocal or the progressive surface will be less thick, more cosmetically desirable, which would facilitate curing of an ophthalmic quality lens. The process for making such a lens is the same as that discussed above, but with a higher index of refraction resin.

It has been found, when curing uneven thicknesses of resin containing photoinitiators, but not thermal initiators, with an actinic radiation source, heat also plays a very important role in equalizing the levels of cure over the uneven thicknesses. It is believed that heat excites the photoinitiators, relaxes the chains and allows for a deeper more even cure. One would normally expect thicker sections of resin, having been exposed to electromagnetic energy of the same wave length, same intensity, and same exposure time to have less cure and less hardness than the thinner sections. By using heat it has been found this cure differential can be reduced significantly.

In a non-limiting example, a flattop "28" multifocal convex mold of 4.50 D containing a resin formulation and a preform of 4.57 D (mold assembly), when exposed to an ultraviolet light source (Phillips TL/IOR/UVA fluorescent lamp) without heat, was found to have a finished surface with a Barcol (hardness test) of @77 in the distance section where a layer thickness of @0.07 mm is applied. In a +2.75 D multifocal segment area where @0.63 mm of thickness was added, the Barcol measurement could be as low as @60 (Barcol) when exposed to the same wavelength, same intensity, and same time exposure. However, when applying heat of @160° F. during the same UV cycle using a separate heat source in addition to the UV wave source used, the Barcol measurements will be @85 (Barcol) in the distance (thin section added) and @84 (Barcol) in the multifocal area (or thick section added). These results were achieved in contrast to the non-heated experiment which used the same resin having no thermal initiators while not changing any other variable with the exception of adding heat.

Thus, the addition of heat, which can be provided from, by way of non-limiting example, a convective, radiative, chemical, conductive, source, can speed up the process and achieve more even cures, and more equal hardness on surfaces of unequal thicknesses. Furthermore, it would appear, when curing an entire thickness of a lens, heat would facilitate a more even cure in areas of the lens where thickness is not constant even though a thermal initiator is not used.

To further facilitate description of exemplary embodiments of the invention, the following non-limiting partial list of acronyms for certain of the compounds discussed herein is provided:

| | |
|---|---|
| DEG-BAC | diethylene glycol bis(allyl) carbonate |
| TTEGDA | tetraethylene glycol diacrylate |
| TRPGDA | tripropylene glycol diacrylate |
| TMPTA | trimethylolpropane triacrylate |
| TFFMA | tetrahydrofurfuryl methacrylate |
| TFFA | tetrahydrofurfuryl acrylate |
| HDDMA | hexanediol dimethacrylate |
| HiRi II | combination of bisphenol A diallyl carbonate, DEG-BAC and anti-yellowing additive available from PPG. |
| DPEPA | dipentaerythritol pentaacrylate |
| BADC | Bisphenol A diallyl carbonate |
| MMA | methyl methacrylate |
| BMA | butyl methacrylate |
| PMA | propyl methacrylate |
| PTETA | pentaerythritol tetraacrylate |

Resin formulations useful in the casting of plastic optics have generally included acrylic or allyl esters, which undergo addition polymerization, or include polyurethanes and epoxies which are formed by condensation polymerization. Resin formulations which may undergo addition polymerization commonly use allyl and bis(allyl) carbonates, alone or in combination with additives, such as acrylic acid, and difunctional or trifunctional acrylics, such as ethylene glycol diacrylate or dimethacrylate or trimethylolpropane triacrylate (for example, HiRi II is a commercially available resin formulation which is commonly used to form optics). Resins which undergo condensation polymerization include mixtures of isocyanates and hydroxylated compounds, which form polyurethanes upon polymerization. Generally, thermal or photochemical polymerization initiators must be combined in the resins to form a hardened optic.

Resins which are polymerized through the mechanism of addition polymerization generally undergo substantial shrinkage during curing; for example, both methyl methacrylate, MMA, and the bis(allyl) carbonate known as CR-39 shrink about 15–20% upon polymerization. Conventional optic casting processes accommodate this shrinkage through the use of compressible gaskets in a mold assembly.

It is possible to reduce the polymerization shrinkage of CR-39 based resins by incorporating polymeric additives, which remain blended with the monomeric components throughout the polymerization process; for example, a copolymer of MMA and allyl methacrylate has been used as a diluent to CR-39. However, these additives reduce the cross-link density of the final cast optic, thus leading to reduced scratch resistance. Nevertheless, even resins with additives which reduce shrinkage during polymerization, still shrink to a substantial degree, necessitating the use of gaskets during the casting process; this renders the resin unsuitable for surface casting a single vision, multifocal or progressive optic on the top of a preformed spherical optic.

A first embodiment of the present invention overcomes the above-mentioned deficiency by providing a resin having sufficient viscosity to support a preformed optic in correct spaced relationship above a mold in order to maintain a minimum resin layer thickness and also allows for relative movement of a preformed optic with respect to a mold so that the resin can shrink during curing. It has been found that viscosity in the range of 25 and 130 centistokes, cst, preferably between 35 and about 120 cst, is required for optimum behavior; resins having viscosities outside of the preferred range will produce an unacceptably high amount of lenses which are not suitable for commercial ophthalmic use. This resin viscosity may be achieved by mixing monomers of appropriate viscosities or by adding solid or liquid high viscosity additives to a resin formulation, which is otherwise optimal for molding optics or surface casting applications; such monomers or additives will be referred to herein as viscosity control agents. Resins formulated with polymeric additives are required to be modified through the addition of cross-linking agents which have high reaction functionalities; this leads to high cross-link densities to compensate for the decrease in overall cross-linking brought about by the polymeric additives.

In a second embodiment, the casting process of the present invention may also utilize spherical preforms which have been surface treated with a polymerizable silane in order to develop a strong interpenetrating polymeric network for enhanced bond strength between the polymeric layer cast onto the surface (surface cast) and the preform (substrate).

The resin formulations and the curing processes described herein may also be used to cast optics without using any optical preform by simply placing a preferred resin formulation between two molds which transmit actinic radiation, and confining the mixture by using a suitable gasket. The relatively high viscosity of the resin formulation (preferably between 35 and 90 cst at 35° C.) will ensure that rate of initiation controlled by diffusion rates is manageably low, leading to a uniform cure without excessive release of heat. Therefore, the latter stages of the cure process can be carried out at a higher temperature, leading to a harder, more scratch resistant optic.

This can be achieved by activation or hydrolysis of the surface of a preform, followed by reaction with an agent capable of increasing bond strength between the preform surface and a resin cast onto the surface. For example, a conventional preform or a preform made of a resin of the present invention can have its surface treated with an alkali, such as aqueous sodium hydroxide, followed by reaction with a solution of acryloxypropyltrimethoxysilane acidified with dilute acetic acid.

Preferred resin formulations include a base component, cross-linker, viscosity control agent, and initiator. The function of the base component is to form a clear optic, and also may serve to solubilize and compatibilize the other components. The reactivity of the base component controls the time required for forming a cast optic with the resin. The preferred cross-linker has the highest polymerization reactivity of the resin ingredients, enhances cross-link density in the system, increases scratch resistance, and improves impact properties of the resultant optic. The preferred viscosity control agents generally have the lowest polymerization reactivity in the system, and have the added benefit of improving the scratch resistance of the resultant optic, and may increase refractive index, provide easy mold release, and promote good bonding between the surface cast and the substrate.

The preferred resin formulations of the present invention are optimized for high refractive index, scratch resistance, and casting characteristics needed for surface casting applications, and are also useable in casting whole lenses or semi-finished blanks. Certain embodiments of the present invention include additives which modify the properties of the resin or resultant optic. For example, mold release agents may be added to facilitate removal of the finished optic from the mold. Other additives may improve the bonding between the preformed optic and the cast-on layer of resin.

Preferred resins comprise about 50–90% by weight of base component, about 5–25% by weight of cross-linker, about 0.5–20% by weight of viscosity control agent and about 0.5–6% by weight initiator.

Suitable base components include allyl-containing compounds, such as DEG-BAC and BADC, acrylics, such as MMA, BMA, and PMA, acrylic terminated polyurethane oligomers derived from aliphatic isocyanates, and aliphatic, alicyclic, or aromatic hydroxy derivatives ranging in molecular weight from 800–5,000, acrylic terminated glycidyl ethers, or acrylic terminated esters.

Preferred cross-linkers include tetrafunctional and pentafunctional acrylics, such as PTETA and DPEPA, and trifunctional acrylics, such as TMPTA. The tetrafunctional and pentafunctional acrylics are preferred since they can produce the highest cross-link density with reduced shrinkage levels. It is believed that the pentaerythritol moiety undergoes a conformational transition during polymerization, which increases molecular volume to offset polymerization shrinkage.

Preferred viscosity control agents include a co-polymer of MMA and allyl methacrylate (such as Luchem from PPG), PMMA molding powder, and fine mesh silica or fumed silica (such as Cab-o-sil from Cabot). Fumed silica is not only effective for controlling viscosity, but enhances the optical clarity and transparency of the optic, and improves scratch resistance.

In fact, in yet another embodiment of the present invention, optical lenses having improved scratch resistance, are formed using a resin containing about 50–90% by weight of base component, about 5–25% by weight of cross-linker, about 0.5–3.0% by weight of fumed silica or fine mesh silica, and about 0.5–6% by weight initiator.

Certain polymeric viscosity control agents, such as Luchem and PMMA molding powder, may lower the scratch resistance of the finished optic; thus, if high scratch resistance is desired in the finished optic, the proportions used should be carefully monitored, or fumed silica or another viscosity control agent which does not adversely effect scratch resistance should be used.

Suitable mold release agents include, but are not limited to acrylic terminated siloxanes or perfluoroalkyl derivatives; preferably the mold release agents have a low polymerization reactivity; a non-limiting example of such a perfluoroalkyl is FX-13, available from 3M Corporation. It is preferred that such perfluoroalkyl derivatives and/or acrylic terminated siloxanes do not exceed 0.3% of the resin composition; it is believed these compounds migrate to the surface of the mold during polymerization, providing mold release properties to the optic.

In certain embodiments, it is desired to use polymerizable additives as a component of the resin formulation which render the surface of the resulting optic antireflective. It is known that presence of a thin surface layer having a refractive index which equals the geometric mean of the refractive indices of the convex side of the optic and air renders the optic antireflective. It is necessary to rigorously control the thickness of such layers in order to achieve the desired level of antireflective character. For optimum effect, the thickness of this surface layer should be one half the wavelength of the light whose reflection is desired to be extinguished, i.e., a layer of 0.3 microns thickness will extinguish the reflection of radiation of wavelength 600 nm. Certain perfluoroalkyl acrylates or methacrylates which have refractive indices in the range of 1.27–1.28 will serve as an antireflective front layer when placed on a resin of refractive index in the range of 1.62–1.68.

In a preferred embodiment, either a single or a combination of two perfluoroalkyl methacrylates are added to the resin formulation. When more than a single acrylate derivative is added, the two monomers should be selected to be different in solubility in the resin formulation and refractive indices, ensuring that the monomer with the higher refractive index has greater solubility. The difference in refractive indices should be approximately 0.02 units. A preferred monomer to develop such an antireflective surface layer is perfluoroheptyl methacrylate, PFHMA (refractive index of polymer: 1.28). In a non-limiting example, PFHMA is added to an acrylic terminated polyurethane oligomer formulation consisting of 30–70% by weight oligomer 10–18% of a diacrylate diluent, such as tetraethylene glycol diacrylate (TRPGDA), 3–6% of a cross-linker such as DPTPA, and 2–5% of a photoinitiator, such as DAROCUR 1173. The desired concentration of the perfluoroacrylate is found to be in the range 100–1000 ppm, sufficient to form a thin surface layer as needed. During polymerization, the perfluoroacrylate monomer survives through the initial reaction, owing to its relatively low polymerization reactivity, and migrates to the surface of the polymerizing resin. The perfluoroacrylate monomer ultimately polymerizes in the surface, forming the surface layer needed for antireflectivity. It is also known that this and other similar perfluoroacrylate monomers provide mold release properties to the optic, hence no additional mold release agent needs to be added. Indeed, addition of a mold release agent which will also migrate to the surface of the optic during polymerization may negate the effect of the antireflective surface layer.

In another embodiment of the process, the perfluoroacrylate monomer with antireflective properties can be surface cast on the optic in a second casting process.

Preferred photoinitiators include aromatic ketones, such as 2-hydroxy-2-methylphenyl propanone (sold as Durcure 1173 by EM Industries of Hawthorne, N.Y.), and 1-hydroxycyclohexylphenyl ketone (such as Irgacure 650 and Irgacure 184 available from Ciba Geigy; note slightly more Irgacure than Durcure by weight may be required to achieve the same result).

Preferred resin compositions are readily photocured in 25 minutes or less when cast in a layer on the surface of a preform (known as surface coating, surface bonding, or surface casting™), and are cured in one hour or less when cast to form whole lenses or semi-finished blanks. Acrylic base components have a high polymerization reactivity, and can be photocured in 5 minutes or less in surface casting applications and in 20 minutes or less in casting whole lenses or semi-finished blanks.

In a preferred embodiment, the polymerization process is controlled by adjustment of key process parameters, such as (1) duration of exposure to UV or other actinic radiation source, (2) the temperature profile of the curing assembly throughout the cure process, and (3) adjustment of volume of resin used depending on the mold, preform, preform diameter, and the desired prescription. Concentration of oxygen and other polymerization inhibitors in the system, and the light transmission properties of the resin formulation and the mold assembly are also important in controlling the rate of polymerization.

In a preferred embodiment of the present invention, superior results are achieved by developing a non-uniform polymerization profile throughout the surface cast. For example, a higher cross-link density can be formed at the interface of the mold and the resin than at the interface of the surface of the preform and the resin. This provides for increased scratch resistance on the surface of the resulting optic, and also contributes to increased bond strength between the resin and the precast optic surface.

It is believed that, when the surface cast is too thin, poor bonding may result as a result of too high a degree of cross-linking of the polymeric layer cast onto the surface of the preform. Furthermore, if the layer cast on the surface is too thin, uniform tinting may not be possible.

It is also believed that a lower cross-link density at the interface between the polymeric layer and the preform may contribute to better adhesion between the surface cast and the substrate. The bonding of the surface cast to the substrate may also be improved by adding adhesion promoters, such as cellulose acetate or cellulose acetate butyrate to the uncured resin formulation. Bonding may also be improved by using a spherical single vision preformed optic, which has been pretreated with a polymerizable silane, such as an acrylic terminated silane (e.g., acryloxytrimethoxysilane); such a treatment leaves polymerizable acryloxy groups permanently bound on the surface of the preform, which may participate in a curing reaction and allow a chemical bond to develop between the preform and the surface cast. It is also possible to roughen the preform surface in order to enhance bonding to a photopolymerizable resin.

A preferred process for curing of the optical resin of the present invention involves photopolymerization via carefully controlled exposure to heat and actinic radiation. Preferred results are achieved when the resin, contained in a mold apparatus (comprising either an upper and lower mold, or a lower mold and a preformed optic), is exposed to actinic radiation having a wavelength range within the absorption band of the photoinitiator, and the intensity of the radiation and duration of exposure is adjusted to control the rate of polymerization.

Non-limiting examples of suitable actinic radiation sources include high pressure mercury arc lamps or coated fluorescent lamps (such as those available from Phillips); such lamps have a relatively high output of longer wavelength UV radiation (380–420 nm) and a relatively low output of medium wavelength UV radiation (330–380 nm).

Improved results are obtained by insuring that the bulk resin (in contrast to resin at the mold-resin interface) is cured in a relatively homogenous manner, and by maintaining a constant chain initiation rate subsequent to the formation of a highly cross-linked surface layer next to the mold. Consequently, it is desirable, and a key objective of a preferred embodiment, to maintain the chain initiation rate within a relatively narrow range throughout the cure process. Thus, in a preferred embodiment, it is desired to start the cure process at a relatively low actinic radiation level; this is because it is believed that the efficiency of formation of initiator radicals is highest at the beginning of the cure process. The rate of chain initiation is a function of the product of the concentration of initiator radicals and the rate of encounter of these radicals with polymerizable functionalities. Chain initiation is dependent on the number of photons absorbed by the initiator per unit time, while the rate of encounter of radicals with polymerizable functionalities is controlled by (1) the reactivity of the radicals, (2) the reactivity of the polymerizable group encountered, and (3) the viscosity of the resin.

It is to be understood, though, that the invention is not to be limited by any particular theory or mechanism of the polymerization reaction.

Since viscosity of the resin is lowest at the beginning of the polymerization process, it is easier for free radicals to diffuse and react with polymerizable functionalities during the early part of the curing process, which leads to an increased rate of polymerization; the rate of polymerization is further increased at the beginning of the cure process, since the most reactive functionalities react first.

Therefore, when thicker lenses or layers of uneven thickness are to be cured, it is desirable, and necessary in certain instances, to use an interrupted actinic radiation flux at the beginning of the cure process; this can be provided by using a timer switch or a chopper to control the actinic radiation flux. Such a blinking light source reduces overall light intensity at the beginning of the cure process and also reduces the waste of initiator radicals by suppressing the radical-radical recombination process. Generally, the blinking is only necessary for about the first 2–8 minutes, preferably the first 5 minutes, of the cure process. Blinking beyond the first 8 minutes is not necessary, but an acceptable lens will still be formed if blinking is continued for longer periods. However, unnecessary blinking may slow down the reaction.

The temperature of the mold assembly has also been found to be an important process parameter, and improved results are obtained by controlling the temperature of the mold assembly during curing. It is believed that the temperature of the mold assembly controls the rate of chain propagation, and hence controls the number of chains formed per unit of light (actinic radiation) flux absorbed by the initiator. The temperature of the mold assembly also controls the rheological properties of the resin.

Despite the teaching in the prior art that it is undesirable to allow the temperature during curing to exceed 120° F. (see U.S. Pat. No. 4,879,318, to Lipscomb, et al.), it has been surprisingly discovered that superior results are obtained by initiating the photocuring process at a temperature between about 110° F. and 120° F., preferably at about 115° F., during initial cure stages, and subsequently ramping the temperature up to between about 160° and 190° F., preferably to about 165° F.–180° F. Preferably, the temperature is increased to a temperature of between about 110° F. and 150° F. during a period lasting between 2 and 12 minutes, and preferably not exceeding 5 minutes. The temperature of the mold apparatus is then slowly and continuously increased to a temperature between 165° F. and 180° F., preferably to about 170° F. until the cure is completed. Optics formed at high temperature (greater than 180° F.) may crack when being annealed, and fused with an ultraviolet absorber or tinted subsequent to cure. They also develop a yellow cast or appearance which is unacceptable for certain purposes.

With reference to FIG. 11, a preferred, non-limiting mold temperature profile is presented, which provides a preferred temperature for the mold assembly which changes with the duration of time which the sample has been exposed to actinic radiation. Line 1 represents a preferred lower limit on the temperature of the mold for a given time following initiation of exposure to UV radiation, which starts at two minutes. Thus, when the sample is initially exposed to UV radiation, the mold temperature is preferably no lower than 110° F., and preferably with respect to line 3 no higher than 130° F., with the median temperature being about 115° F. The upper and lower preferred temperatures, as represented by lines 1 and 3, were generated by treating multiple samples at different temperatures, and by determining the temperatures beneath which, or above which, an unacceptably high percentage (greater than 5%) of defective optics were formed. Thus, lines 1 and 3 are formed from average values required to achieve acceptable optics. Line 2 is taken from the median temperature values for 12 samples which resulted in acceptable optics. Note that initial cure temperatures between 110° F. and 130° F. and final cure temperatures between 165° F. and 180° F. resulted in substantial yield of acceptable optics, while temperatures between lines 1 and 3 provided optimal results.

The preferred temperature profile ensures that the viscosity of the resin is held within the desired range, since the rising temperature compensates for the increase in viscosity which results from the curing reaction. If the curing reaction is carried out outside the aforementioned preferred temperature ranges, the optic may develop optical defects, such as astigmatism, or may develop mechanical defects caused by premature shrinkage away from the edge of the multifocal segment. Premature hardening leads to the development of flow marks and other defects, rendering the product unsuitable for optical applications. An acceptable quality optic may be formed at low temperature (lower than the preferred range), but may have an unacceptably low scratch resistance and/or may delaminate from the preformed optic.

The casting method of the present invention is facilitated by having readily available a number of (1) optical preforms, (2) molds, and (3) apparatus for dispensing specified volumes of resin, as well as having available (4) at least one curing chamber, which provides for heating of resin-filled molds and subjecting same to actinic radiation sufficient to cure the resin.

In one embodiment, optical preforms having four base curvatures can incorporate the entire range of spherical powers between +6.00 D and –6.00 D [(e.g., 500 mm, (2 base), 250 mm (four base), 166 mm (6 base), and 125 mm (8 base)], while maintaining the thickness of the resultant optic at an acceptable level. Forty-nine (49) different types of optical preforms, each having a unique spherical power, are required to cover the range of spherical powers between +6.00 D and –6.00 D.

Preferred molds may have one or more locating points at the center, in order to allow a specified level of displacement of the preform with respect to the mold along any meridian. A preferred embodiment of the present invention allows for the use of preformed optics and molds of identical curvatures, or curvatures which differ by no more than 10% (i.e., a mold with curvature of 166 mm can accommodate optic preforms of curvature in the range of 182 mm to 150 mm); in this preferred embodiment optical preforms and molds should have curvatures that differ at most by 15%.

The resin and casting method of the present invention allows formation of prism along any vector by way of either adding in specific location thicknesses by way of spacers or wedges made of different materials (e.g., tape, small pieces of plastic), or purposely displacing the optical center of the preform with respect to the mold of the right lens relative to that of the left lens, and also allows displacement of a bifocal or trifocal segment toward or away from the optical center of the optical preform in order to create separate optics for the left and right eye by way of preform mold positioning.

Thus, the present invention allows for the easy and fast in-office formation of optics of predetermined power and curvature (such that the difference between the cast prescriptions and the predicted prescriptions are well within standards established by the American National Standards Institute, ANSI); the power and curvature of the resulting optic may be the same or different from the spherical power and curvature of the mold and/or the optical preform; further, the method is capable of increasing the radius of curvature of the convex surface of a finished optic relative to the radius of curvature of the optical preform, thus placing the convex surface of the finished optic under compression, and consequently increasing it's impact strength.

In a preferred embodiment, the mold tray of FIGS. 7 and 8 is used, which as described above is provided with a protractor to guide proper placement or orientation of the multifocal segment or the progressive segment of the mold with respect to the optical center and the axis of the cylinder in a single-vision optic or preform placed on a mold on the tray, without constraining the movement of the single-vision optic with respect to the mold during the cure process. The mold tray also allows for positioning of the optic axis of the optical preform in a non-vertical direction, enabling displacement of the optical center of the preform from the optical center of the mold along any meridian, without the optical preform being displaced from its correct spatial relationship with respect to the mold before and during the curing process. In a preferred embodiment, the mold tray holds a mold assembly (consisting of a mold, preformed optic and resin) at a predetermined height in the cure compartment of a suitable curing apparatus, such as that shown in FIG. 9 so that air may flow about the mold assembly to provide for an even temperature distribution. Preferably, the mold tray has an adjustable support system, which allows the height of the mold to be adjusted independently on each side, so that the center of the single-vision optic can be displaced relative to the center of the mold; this can be accomplished by introducing an adjustment device (e.g., a lever or a support) which can introduce a height difference between opposed points on the periphery of the mold so as to maintain the top surface of the single-vision optic floating on top of the resin in a horizontal position; a non-limiting example of such an adjustment device are fingers 68 in FIGS. 7 and 8, and in FIG. 9.

It is also possible to minimize failures associated with the segment line in flattop bifocal or multifocal optics by altering the curvature of the preform casting surface locally, which may be accomplished, for example, by a simple grinding process. For example, a local flattening of the preform casting surface opposite and in the area of the segment line of the mold will lead to a more gradual increase in thickness of the cast resin going from the distance portion of the optic to the add portion. The volume of resin needed to develop an ophthalmic optic of acceptable quality will depend on the level of alteration of the preform curvature, i.e., the volume of plastic removed from the convex surface of the preform. In a non-limiting example, the center of the casting surface has a lower degree of curvature than the average curvature of the remainder of the casting surface of the preform; for example, a circular area having a lower degree of curvature than the rest of the casting surface of the preform, and having its center at the geometrical center of the preform, would have a radius which would bisect the center of the bifocal segment line on the molding surface. The casting surface is placed in contact with resin on the molding surface, so that the area having a lower degree of curvature than the average curvature of the remainder of the casting surface is aligned opposite (vertically above) at least a portion of the area of the molding surface immediately adjacent to and surrounding the indentation in the molding surface which forms the bifocal or multifocal flattop segment. Thus the distance between the preform casting surface and the molding surface would be greater in the area near the bifocal or multifocal segment than at the preform periphery.

The thickness of the centers of the resultant surface cast optics can be minimized by choosing a larger number of base curvatures for the optical preforms. However, increasing the number of base curvatures will proportionally increase the number of corresponding molds needed. Thus, in an alternate embodiment, three base curvatures are deemed to adequately cover the entire range of the thirty-three (33) most common spherical powers (e.g., +4.00 D to −4.00 D in 0.25 D increments) of the optical preforms and maintain the center thickness of flattop optics within ANSI Standards.

Preferably, nine (9) different power levels of cylinder, ranging from 0.00 D–2.00 D in 0.25 D increments are incorporated at each level of spherical power of the optical preforms. Therefore, 297 optical preforms will cover this most common prescription range. The dioptic range of cylinder power can be expanded with other optical preforms.

In another embodiment of the present invention, the molds are ground to the same base curvatures as the optical preforms. Each mold may include a depression for incorporating a multifocal segment into the finished lens (a flattop mold), or a depression for forming a progressive segment on a finished optic (a progressive mold). This embodiment would cover the range of add powers between +1.00 D to +3.25 D, in +0.25 D increments. Thus, 10 flattop molds are needed at each base curvature, or a total of 60 different flattop molds (counting a pair of molds for the left and the right eye) are needed to cover the entire prescription range for this embodiment. Another 60 progressive molds of a suitable design are needed to cover the same add power range.

It is to be understood that other embodiments of the present invention may include the use of a larger or smaller number of base curvatures of optical preforms, and a correspondingly larger inventory of molds. It is also possible to provide a plurality of molds per base curvature in order to achieve a predetermined difference between the curvature of the concave surface of the mold and the convex surface of the optical preform.

Optical preforms used in the present invention may be formed from a wide range of compositions and have varying refractive indices. Unlike prior art methods, the present invention allows for the use of optical preforms formed of the same or different components or having a different refractive index as the liquid resin cast thereon. The optical preform may be surface treated, if necessary, to develop a strong and durable bond between itself and the cured resin.

A preferred resin is specifically formulated to achieve a predetermined viscosity and photopolymerization reactivity. The resin may include photopolymerizable monomers or oligomers, cross-linking agents, additives to control shrinkage and flow properties, thickeners to control the viscosity at all temperature levels, and photoinitiators which absorb ultraviolet radiation provided by the ultraviolet source included in the curing chamber.

A non-limiting example of a suitable resin formulation for use in the present invention includes:

| | |
|---|---|
| bis(allyl) carbonate (e.g., CR-39) | 89.5% |
| dipentaerythritol pentaacrylate | 5.5% |
| fumed silica | 2.0% |
| photoinitiator | 3.0% |
| A tinting agent may also be added. | |

Resin viscosity is a critical property, which enables successful operation of the preferred methods for casting polymerizable resin onto the surface of a preformed. It is critical that the viscosity range from between 25 centistokes (cst) to 120 cst. In a preferred embodiment, the viscosity of the resin is between 35 cst and 90 cst.

In a particularly preferred embodiment, the viscosity of the resin is adjusted by the addition of fumed silica. Table 1 below compares the viscosity of a liquid resin formulation containing fumed silica at three different temperatures.

TABLE 1

Viscosity vs. Temperature of Resin Formulations Having Different Weight Percentages of Fumed Silica

| Percent by Weight Fumed Silica | Viscosity at 68° F. (cst) | Viscosity at 77° F. (cst) | Viscosity at 104° F. (cst) |
|---|---|---|---|
| 1 | 27.4 | 21.7 | 13.1 |
| 2 | 45.2 | 35.2 | 20.7 |
| 3 | 111.2 | 73.5 | 21.8* |

*This sample changed viscosity over time

The resin formulation for the samples in Table 1 comprises 88–90% of the bis(allyl) carbonate known as CR-39 (PPG), 6% DPEPA, fumed silica (in the amounts indicated in Table 1), and 3% of a photoinitiator known as Durcure 1173.

Fine mesh silica may be given different types of surface treatments in order to alter as needed and thus control the surface chemical composition of the silica particles. Thus, the surface of fumed silica is rich in hydroxyl groups, which render the surface hydrophilic. Silica of this type of surface composition and properties is especially suited for blending with polar resin formulations, e.g., those including acrylic terminated polyurethane oligomers. Fine mesh silica treated with a hydrophobic silane bearing a reactive group has a hydrophobic surface, and is especially suitable for blending with hydrophobic resin formulations, e.g., one based on DEG-BAC. Sometimes, special thixotropic effects needed for uniform cure of thick segments may be achieved by blending hydrophilic silica with hydrophobic resin formulations.

It has been discovered that resins having too low a viscosity will cause optical distortion in the thicker section of progressive optics, and will also lead to formation of thin spots in the spherical region in flattop optics, leading to uneven tint uptake. Resins with too high a viscosity will cause unwanted astigmatism in flattop and progressive optics.

In addition to viscosity, it is important that a correct volume of resin is placed into the mold assembly. The volume of resin is dependent upon the prescription desired and the preform diameter. A predetermined volume of resin having a known specific viscosity is placed into a mold, and a single-vision preform is placed on top of the resin, so the weight of the preform forces the resin to spread out to a specified thickness. In a preferred embodiment, the resin thickness is sufficient to accommodate cure shrinkage, while maintaining a minimum thickness of 0.05 mm of cured resin throughout the distance portion and a thickness ranging up to 0.7 mm in the add portion of flattop prescriptions. The minimum thickness is higher for progressives, and depends on the design of the optic as well as on the add power provided by the mold.

The volume of resin needed to form a particular prescription is dependent upon (1) curvature, shape, and size of the mold, (2) the magnitude of the add, (3) the disparity between the radii of curvature of the mold and the optical preform adjacent to the surface of the mold. and (4) the surface area of the preform onto which resin is to be cast. Table 2 below provides experimental data on results for different resin volumes for a selected set of prescriptions. In a preferred embodiment, a list of resin volumes required for each prescription can be determined empirically or calculated, checked by test runs, then entered into the memory of a microcomputer controlling the operation of a resin dispenser, which, in a preferred embodiment, is integrated with a curing chamber, controlled by the same microprocessor, and which can automatically relate a prescription to a specified volume of resin, and dispense the correct resin volume.

TABLE 2

Non-limiting exemplary experiments comparing volume of resin to quality of resulting prescriptions.

| Power of Single Vision Optic sphere/astig | Mold Power Base curve/add | Resin Volume ml | Failure Mode |
| --- | --- | --- | --- |
| −1.25D/−0.75D | −6.25D/2.75D | 0.55 | Prerelease |
| −1.12D/−0.87D | −6.25D/2.75D | 0.54 | Crack |
| −0.62D/−1.50D | −6.25D/2.75D | 0.52 | Pass |
| −1.62D/−1.50D | −6.25D/2.75D | 0.52 | Pass |
| −0.32D/−1.50D | −6.25D/2.00D | 0.49 | Pass |

TABLE 2-continued

Non-limiting exemplary experiments comparing volume of resin to quality of resulting prescriptions.

| Power of Single Vision Optic sphere/astig | Mold Power Base curve/add | Resin Volume ml | Failure Mode |
| --- | --- | --- | --- |
| −0.12D/−1.50D | −6.25D/2.00D | 0.52 | Prerelease |
| −3.75D/−1.50D | −4.49D/2.00D | 0.54 | Prerelease |
| −3.75D/−1.50D | −4.49D/2.00D | 0.40 | Pass |
| −3.37D/−1.50D | −4.49D/2.00D | 0.40 | Pass |

Optimal results are obtained for lenses having flattop multifocal segments by controlling resin volume to within +/−0.01 ml, but a wider tolerance in volume dispensation up to about +/−0.02 ml may be acceptable in some instances for flattop multifocal segments; a larger margin of error may be tolerated in the volume needed to form certain progressives, which require a larger volume of resin. More than one combination of mold curvature, shape, size, and add power may lead to the same net volume of resin required for casting.

The volume and viscosity needed for a certain prescription of the resin are strongly interdependent, i.e., a change in the resin viscosity leads to a change in the volume of resin needed for a particular prescription. Generally speaking, a reduction in viscosity of the resin leads to an increase in the volume requirement, although, for maximum yields of optic casts by this method, there is a preferred range of viscosity and corresponding range of resin volume.

In a preferred embodiment, optimal volumes of properly formulated resins having a specific viscosity are required for selected combinations of preforms and molds; the preforms and molds have specified curvatures which determine the proper volume of resin required. By use of a preferred volume for specific viscosity and combinations of preform and mold, it is possible to achieve a greater than 90%, greater than 95% in certain embodiments, success rate, as determined by the percentage yield of acceptable optics. Experiments using 4, 6, and 8 base flattop "28" bifocal molds having add powers from +1.00 D to +3.00 D, demonstrate that, diverging from these optimized volumes by as little as 0.02 ml can radically increase failure rate. The following table provides optimized volumes for selected combinations of 4, 6, and 8 base flattop "28" bifocal molds (4 base indicates a mold with a molding surface having a radius of curvature of 250 mm; "28" indicates that the bifocal forming segment in the mold has a length of 28 mm); all preforms had a casting surface of 75 mm diameter and a known convex radius of curvature; a 4/100 mold indicates a 4 base mold having a 1.00 add power and a known concave radius of curvature:

| Mold | Volume Required To Obtain High Yield of Acceptable Optics (ml) |
| --- | --- |
| 4/100 | 0.31 |
| 4/200 | 0.40 |
| 4/275 | 0.48 |
| 6/100 | 0.35 |
| 6/200 | 0.49 |
| 6/275 | 0.51 |
| 8/100 | 0.63 |
| 8/200 | 0.85 |
| 8/250 | 1.20 |

The following table provides optimal volumes for producing 4, 6, and 8 base progressive lenses utilizing a preform of 75 mm diameter:

| Mold | Volume (ml) |
| --- | --- |
| 4/100 | 1.31 |
| 4/200 | 3.30 |
| 4/300 | 4.60 |
| 6/100 | 2.44 |
| 6/200 | 4.15 |
| 6/300 | 6.28 |
| 8/100 | 3.20 |
| 8/200 | 6.20 |
| 8/275 | 7.20 |

Note that for progressives, a larger volume of resin is used.

In order to fill a prescription using the present invention, an optical preform and a mold are selected from inventory on the basis of a needed prescription. In a preferred embodiment, a mold tray and protractor, such as that illustrated in FIGS. 7 and 8 is provided, which allows for easy and accurate alignment of the single vision optic with the mold. In an alternative embodiment, the required alignment may be achieved by having angular indices (in degrees or radians) etched on the edge of the mold itself.

Since no support is required for the mold or the optical preform at any stage of the curing process, the mold assembly may be cured in a free standing fashion, without the aid of any fixture, provided the preformed optic and mold are properly aligned prior to initiating curing. Maintenance of the alignment between the mold and the single-vision optic is critical to the success of the casting operation; therefore, care should be taken while moving a resin-loaded mold assembly into a curing chamber. Care should be taken while moving a resin-loaded mold assembly into a curing chamber. The properties of the resin, such as its viscosity provide for stability, so that alignment of the preformed optic and mold can be maintained while moving a resin-loaded mold assembly, and prevents the preform from contacting the mold surface.

In a preferred embodiment, the curing chamber is designed to provide a uniform flux of ultraviolet radiation to the resin throughout the total mold surface, including the edges, which undergo cure at the same rate as the center of the mold; hence the openings 66 in platform 64 of mold tray 60 should be sufficiently larger in diameter than the mold assembly resting on fingers 68.

It is to be noted that there are many alternative configurations of curing apparatus which can provide acceptable curing conditions; it is not essential that mold assemblies be placed on a mold tray in the curing chamber.

In a preferred embodiment, the cure compartment is separated from upper and lower UV sources by upper and lower opacified pyrex glass plates (such as dividers 90 and 92 in FIG. 10); each plate has clear circular regions of a diameter not less than 85 mm, which can transmit ultraviolet radiation (corresponding to windows 96 in FIG. 9); these correspond to the "working areas" of the compartment. A bank of medium pressure fluorescent arc lamps are situated above and below the curing compartment in order to provide the needed ultraviolet flux through the clear working areas. These lamps are designed to provide up to half their total energy output in the wavelength range of 320–400 nm. The ultraviolet input into the curing compartment is modulated by a pair of choppers, stationed between the lamps and the pyrex plates. These choppers alternate between open and closed positions (i.e., not covering the clear working areas and covering the clear working areas) and can be programmed to provide a wide range of combinations of light and dark periods. The choppers are only required for a certain limited set of prescriptions having higher multifocal or progressive add power.

In a preferred embodiment, the actinic radiation source(s) is (are) located exterior to the heated curing chamber; by not subjecting the actinic radiation source(s) to the elevated and fluctuating temperatures of the curing chamber, longer life of the actinic radiation source(s) is achieved as well as better control of the intensity of the radiation produced.

A preferred curing apparatus should provide a heating apparatus which can carefully control the temperature in the curing compartment, and ramp the temperature up from ambient temperature or the initial cure temperature to the maximum desired temperature in a carefully controlled fashion. A non-limiting example of such a heating apparatus includes strip heaters, a blower (for circulating and providing a homogenous ambient oven temperature), a set of temperature sensors operatively connected to a feedback circuit for temperature control, and a microprocessor-run controller which regulates the heating apparatus based on predetermined variables and feedback from the sensors. In a preferred embodiment, a cooling cycle is provided for.

Different cure profiles may be developed for curing different prescriptions; certain cure profiles may be suitable for most prescriptions. As noted before, the temperature at the early stages of cure controls resin viscosity and hence resin flow. Therefore, variations in the temperature of the cure at the beginning of the cure process should be smaller, and temperature control should be carefully regulated at the early portion of the cure process.

In the early portion of the cure process, resin viscosity is relied upon to determine the position of the single-vision optic with respect to the mold, rather than relying upon fixtures to support the mold and optical preform in spaced relationship as required by prior art lens casting methods; thus, the present invention overcomes the inherent limitations imposed by such external support fixtures or gaskets. After the resin has gelled sufficiently, the temperature profile is designed to maintain a constant or near constant cure profile; the increased molecular energy due to increased temperature compensates for the slow down in the cure rate brought about by the decrease in the molecular mobility and diffusion rates of the resin as it cures. Preferred curing profiles, such as those encompassed by FIG. 11, (1) minimize mechanical stresses in the finished optic which may arise due to the curing process, (2) create a more uniform cure throughout the resin volume, and (3) develop a highly cross-linked, hard, scratch resistant surface on the optic.

When using a thermal initiator, it is not necessary in some embodiments to use a photoinitiator; the temperature of the resin in the mold assembly would be gradually increased to offset the increase in viscosity due to curing of the resin.

Another embodiment comprises use of a preform which has been surface treated to form a strong and durable bond with the resin layer cast over it. The bond strength can be increased by altering the surface area of the preform, for example, by roughening it. For best results, roughening of the convex surface of the preform should introduce a fine network of minute but shallow scratches, barely visible in transmitted light. The pattern should be irregular, and care should be taken to avoid a linear array of scratches or a series of concentric scratches. A surface roughened preform may also be cast by using surface treated molds. Other types of surface treatments may also be used either in lieu of scratches, or in conjunction with it. These may include, without limitation, treatment with a reactive silane, following a treatment with an etchant such as aqueous sodium hydroxide.

Thus, in a preferred embodiment, the present invention discloses a molding process which relates the variables of cure time, cure temperature, resin volume, resin viscosity, and resin component reactivity to provide an improved method for forming optics capable of being used for in-office casting of optics. In another embodiment, the present invention relates resin volume to the desired prescription. The resin and casting method of the present invention overcomes the deficiencies of the prior art, which resulted in the lack of commercial use of any in-office casting technology based on prior art methods which could provide a wide range of prescriptions, such as the range of prescriptions required by a typical optical practice. It is believed that the limitations of the prior art methods constitute critical obstacles to the commercialization of prior art methods, and that by overcoming these limitations, the present invention provides an improved, faster and easier in-office method for producing high quality monofocal, spherical or aspheric, multifocal, or progressive lenses.

In an alternate embodiment, the resin formulation utilizes a thermal initiator, rather than a photoinitiator. The resin can be cured as described herein in the curing chamber by use of externally applied heat, or additional compounds can be added to the resin formulation which react to chemically provide the heat ("chemical heating means") for the curing reaction.

Specific exemplary compositions and methods of forming ophthalmic lenses are described in the following non-limiting examples. All technical and scientific terms used herein have the same meaning as commonly understood by one of ordinary skill in the art. Other methods and materials similar or equivalent to those described herein can be used in the practice or testing of the present invention.

EXAMPLE 1

A resin formulation was formed by combining the following ingredients in the weight percentages indicated:

| | |
|---|---|
| Bis(allyl) carbonate (CR-39) | 79.5% |
| Co-polymer of MMA and allyl methacrylate (Luchem) | 13.5% |
| PTETA | 5.0% |
| Photoinitiator (Durcure 1173) | 3.0% |

The resin was used to form a progressive optic with a 2.50 D add, starting with a preformed optic having a 75 mm diameter and a base curve of 8.21 D, and a mold formed of crown glass which had the same base curvature as the preformed optic. A quantity of resin 7.40 ml was placed into a mold having an indentation matching the desired progressive correction, and the preformed optic was floated on the resin. No gasket or other fixture used, which would hold the preformed optic and mold in spaced relationship. The mold assembly was placed in a curing chamber held at a temperature of 120° F. The mold assembly temperature reached a temperature of 115° F. in 2 minutes, and was then subjected to a blinking ultraviolet radiation source for 5 minutes; the blinking cycle exposed the resin to the radiation for 60 seconds, then the radiation source was turned off, or blocked off from the sample, for 15 seconds. The temperature was gradually raised to 150° F. during the first 5 minutes. At the conclusion of the initial phase (the first 5 minutes), the sample was continuously exposed to UV radiation (i.e., the blinking cycle was terminated) and the temperature was continuously raised so that it reached 167° F. at the end of 27 minutes. Thus, the total cure time was about 25 minutes. The resulting optic had a refractive index of 1.50 as measured on an Abbe' refractometer using bromonophthalene to form optical contact, and a scratch resistance of 1.0 with a Bayer abrader and hazemeter. A uniform tint was achieved when the optic was emersed and annealed in a tint medium for 3 minutes at 185° F. The optic had unwanted optical astigmatism less than 0.10 D.

EXAMPLE 2

A resin formulation was made by combining the following ingredients in the following weight percentages:

| | |
|---|---|
| Bis(allyl) carbonate (CR-39) | 89.0% |
| DPEPA | 5.0% |
| Fumed silica (Cab-o-sil) | 2.5% |
| Photoinitiator (Durcure 1173) | 3.5% |

A preform (base curve of 6.0, diameter of 75 mm, and CR-39-based) was treated with a silane derivative by (1) etching the preform in an aqueous solution of 6M sodium hydroxide (30 minutes at 104° F.) to form hydroxyl and carboxyl groups at the surface, (2) thoroughly washing the preform in water, (3) adding acryloxypropyltrimethoxy silane to a 1N solution of acetic acid to form a 2% w/w solution (4) heating the silane solution to 122° F. for 30 minutes, and (5) immersing the etched preform into the silane solution for 1 hour. The preform was then withdrawn from the silane solution, washed with water, washed with acetone, and dried to remove the solvent. The silane-treated preform was then used to form an optic with a bifocal segment of 2.50 D add following the procedure of Example 1 (a total of about 25 minutes curing). The resultant optic had a refractive index of 1.50 and a scratch resistance of 1.4 in the Bayer abrader and hazemeter. Annealing and tinting of the lens was performed by emersion of the finished optic in a tint bath at 185° F. for approximately five minutes, which resulted in a uniform tint, and the optic had unwanted optical astigmatism of less than 0.10 D.

EXAMPLE 3

A single-vision optic having a spherical power of −1.62 D, astigmatism of −1.50 D and convex curvature of 158 mm (6.33 base curve) and having a diameter of 75 mm, and a flattop mold (e.g., a mold having a recess in the shape of a multifocal segment which will alter the power of the resultant optic) having a concave curvature of 166 mm (6.25 base curve) and a bifocal segment with an add power of 2.75 D were selected to form a final prescription. 0.49 ml of the resin of Example 2 was delivered into the mold by means of an electronic pipette, and the single-vision optic was floated on the resin. The mold assembly, having an initial temperature of 80° F., was placed in the curing chamber and warmed for 2 minutes at 90°–110° F. prior to initiating exposure of the sample to UV radiation from the previously described UV source. The temperature of the mold assembly was 90° F. at the end of two minutes of application of heat. The choppers were activated at this time, with the blinking pattern providing a 12 second exposure alternating with a 60 second dark period. The blinking was continued for 5 minutes, and then the sample was continuously exposed to UV radiation. The temperature of the mold assembly rose steadily, rising to 120° F. at the end of 7 minutes. Temperature continued to rise as the radiation exposure continued, reaching 170° F. at the end of 27 minutes. The cure was discontinued after 27 minutes and the mold assembly was withdrawn from the chamber, and demolded to retrieve the optic. The optic was annealed by immersing it in water at 185° F. for 2 minutes, then tested for optical and cosmetic quality. The spherical power was found to be −1.75 D, astigmatism was −1.50 D, add power was 2.62 D, and convex curvature was 158 mm. Cosmetic quality of the finished optic was acceptable. Tests on an optic, which had the same shape as a standard used in scratch resistance testing and prepared in an identical fashion revealed a scratch resistance of 1.2 measured on a Bayer abrader tester.

EXAMPLE 4

A final prescription of a bifocal optic with a spherical power of −3.87 D, a cylinder of −1.50 D, and add power of 2.00 D was cast, starting with a single-vision optic as follows. A spherical single-vision optic having a diameter of 75 mm, a spherical power of −3.87 D, a cylinder of −1.50 D, and a convex radius of curvature of 217 mm (4.6 base curvature) was selected, along with a glass mold of concave radius of curvature of 223 mm (4.49 base power) and an add power of 2.00D. This mold had 5 indicator points etched on the convex surface, one at the optical center and two on either side of the center, 1 mm apart. 0.40 ml of the resin of Example 2 was delivered into the mold onto its molding surface from a resin dispenser, and the single-vision optic was floated on the resin with its coating or casting surface contacting the resin; this forced the resin in the space between the molding surface and the casting surface to conform to the contours of the portions of the molding surface and casting surface between which the resin was situated. The optical center of the preform was displaced with respect to the segment forming portion of the mold, which results in the preform resting at an angle; by adjusting for 1 mm displacement by adjusting the height of a point on the mold's periphery with respect to an opposed point on the mold periphery. The mold tray was then placed in the curing compartment and the standard cure cycle described in Example 1 was followed. The final prescription was found to have a prescription which was within ANSI standards for the desired prescription and the optical center of the resultant lens was moved with respect to the segment.

EXAMPLE 5

A resin formulation was made by combining bis(allyl) carbonate, DPEPA, and the photoinitiator, Durcure 1173 in the same relative ratios to each other as set forth in Example 2. To the resin formulation, different concentrations of silica were added to adjust the viscosity at 68° F.; the amount of silica needed to adjust the viscosity was extrapolated from the data in Table 1. Then a series of prescriptions were formed using preforms having a diameter of 75 mm following the procedure of Example 1, and the results are provided below in tabular form, which indicate the power of the preformed optic, the power of the mold, the viscosity of the resin, and whether the resulting optic passed (i.e., formed an acceptable ophthalmic lens) or failed (i.e., either prereleased, cracked, or had distortion).

TABLE 3

| Power of Preformed sphere/astig | Power of mold, curve/add | Viscosity at 68° F., cst | Failure Mode |
|---|---|---|---|
| −1.62D/−1.50D | −6.25D/2.75D | 20.0 | Prerelease |
| −1.00D/−0.78D | −6.25D/2.75D | 68.0 | Pass |
| −0.62D/−1.50D | −6.25D/2.75D | 130.0 | Distortion |
| −1.62D/−1.75D | −6.25D/2.75D | 35.0 | Pass |
| −3.87D/0.0D | −8.25D/2.00D | 20.0 | Prerelease |
| −4.37D/0.0D | −8.25D/2.00D | 60.0 | Pass |
| −3.87D/0.75D | −4.49D/2.00D | 22.0 | Crack |
| −3.87D/1.50D | −4.49D/2.75D | 25.0 | Prerelease |
| −3.87D/1.50D | −4.49D/2.00D | 75.0 | Pass |

It is clear from Table 3 that viscosities above 25.0 and less than 130 cst at 68° F. are important to achieving an acceptable optic. Thus, resin viscosity plays a critical role in maintaining the necessary thickness of a resin layer between a single-vision optic and a mold, and at the same time allow sufficient intermolecular motion and flow of the uncured resin throughout the casting layer before and immediately after gelation.

Thinner Progressive Lenses

In order to cast a progressive lens from a preformed optic, it is necessary to cast a relatively thick layer or segment of plastic on top of the casting surface of the preform, especially in the progressive addition area. It has been discovered that thinner progressives can be formed using the present invention by using a preform, which has a casting surface with a higher degree of curvature than that of the molding surface of the mold. The higher degree of curvature allows the preform to fit into the aspheric mold cavity in the mold to minimize added thickness.

EXAMPLE 6

A spherical power plate having a diameter of 75 mm, and having a convex curvature of 4.57 D, with an add power of −2.55 D was used with a progressive mold which had a concave curvature on its molding surface of 4.15 D and a progressive forming segment having an add power of +1.00 D. The resin used in Example 2 (1.31 ml) was placed on the molding surface of the mold, and the convex casting surface of the preform was placed in contact with the resin. The resin was cured following the procedure of Example 1, but the ultraviolet radiation was not blinked during the exposure to UV radiation. The preform had a thickness at its center of 2.10 mm, while the resulting progressive optic had a thickness at its center of 2.38 mm.

While certain embodiments of the present invention have been described in detail, it is to be understood that many variations and alterations of the present invention can be made without departing from the spirit and scope thereof as defined by the following claims.

We claim:

1. A resin for forming a coating upon an optical preform in a gasketless casting process, comprising: about 50–90% by weight of a polymerizable base component; no more than about 25% by weight of a cross-linker; between about 0.5% and 6% by weight of an initiator; and between about 0.5% and 20% by weight of a viscosity control agent; wherein the resin has a viscosity greater than 25 centistokes and less than 130 centistokes at 68° F.

2. The resin of claim 1, wherein the base component comprises at least one compound selected from the group consisting of allylic compounds and acrylic compounds.

3. The resin of claim 1, wherein the cross-linker comprises at least one compound selected from the group consisting of trifunctional acrylics, tetrafunctional acrylics, and pentafunctional acrylics.

4. The resin of claim 1, wherein the viscosity control agent comprises at least one substance selected from the group consisting of fine mesh silica, fumed silica, acrylic acid ester polymers, and polymethyl methacrylate molding powder.

5. The resin of claim 1, wherein the initiator comprises an aromatic ketone.

6. The resin of claim 1, wherein the base component comprises at least one compound selected from the group consisting of allylic compounds and acrylic compounds; the cross-linker comprises at least one compound selected from the group consisting of trifunctional acrylics, tetrafunctional acrylics, and pentafunctional acrylics; the viscosity control agent comprises at least one substance selected from the group consisting of fine mesh silica, fumed silica, acrylic acid ester polymers, and polymethyl methacrylate molding powder; and the initiator comprises an aromatic ketone.

7. The resin of claim 1, wherein the resin comprises between about 0.5 and 3.5% by weight of the viscosity control agent, the viscosity control agent comprising a instance selected from the group consisting of fine mesh silica and fumed silica; wherein the resin, when cured by actinic radiation, forms a clear plastic having a refractive index equal to or higher than 1.50 and an abrasion resistance higher than 1.0 in a Bayer abrader and hazemeter.

8. The resin of claim 7, further comprising a mold release agent.

9. The resin of claim 8, wherein the resin comprises no more than 0.3% by weight of the mold release agent and the mold release agent comprises at least one compound selected from the group consisting of acrylic terminated siloxanes, perfluoroalkyl acrylates, and perfluoroalkyl methacrylates.

10. The resin of claim 9, wherein the mold release agent is a perfluoroalkyl sulfonamide methacrylate.

11. A resin composition for forming a coating upon an optical preform in a gasketless casting process, comprising: about 70–90% by weight of a bis(allyl) carbonate; between about 0.5% and 20% by weight of a viscosity control agent; between about 5% and 15% by weight of a polyfunctional acrylate cross-linking agent; and between about 0.5% and 6% of an initiator; wherein the resin has a viscosity greater than about 25 centistokes and less than about 130 centistokes at 68° F.

12. The resin of claim 11, wherein:

the bis(allyl) carbonate comprises at least one compound selected from the group consisting of diethylene glycol bis(allyl) carbonate and bisphenol A diallyl carbonate;

the viscosity control agent comprises at least one substance selected from the group consisting of a co-polymer of methyl methacrylate and allyl methacrylate, fumed silica, and fine mesh silica; wherein, when the viscosity control agent is a co-polymer of methyl methacrylate and allyl methacrylate, the viscosity control agent is present in an amount between about 1 and 15% by weight of the resin; and, wherein, when the viscosity control agent is selected from the group consisting of fumed silica and fine mesh silica, the viscosity control agent comprises about 0.5% and 3.5% of the resin;

the polyfunctional cross-linking agent comprises between about 1% and 15% of the resin, and the cross-linking agent comprises at least one compound selected from the group consisting of dipentaerythritol pentaacrylate and pentaerythritol tetraacrylate; and the initiator comprises between about 2.5 and about 4% by weight of the resin; the initiator being selected from the group consisting of 2-hydroxy-2-methyl-1-phenyl-propan-1-one, and 1-hydroxycyclohexylphenyl ketone.

13. The resin of claim 11, wherein the viscosity control agent comprises between about 0.5% to 3.5% by weight of the resin, the viscosity control agent comprising a substance selected from the group consisting of fumed silica and fine mesh silica.

14. A polymerizable optical resin for forming a coating upon an optical preform in a gasketless casting process, comprising:

0.5% to 3.5% by weight fumed silica or fine mesh silica, and at least one polymerizable compound, wherein the resin has a viscosity greater than about 25 centistokes and less than about 130 centistokes at 68° F. and forms a solid upon being cured.

15. A resin according to claim 1, wherein the initiator comprises a photoinitiator, a thermal initiator, or both a photoinitiator and a thermal initiator.

16. The resin of claim 15, further comprising compounds which react to provide heat, wherein, when the compounds which react to provide heat react, the heat of reaction is sufficient to at least partially cure the resin.

17. A polymerizable optical resin for forming a coating upon an optical preform in a gasketless casting process, comprising:

a polymerizable compound and 0.5% to 3.5% fumed silica or fine mesh surface treated silica, wherein the resin has a viscosity greater than about 25 centistokes and less than about 130 centistokes at 68° F. and, when cured, forms a solid having a scratch resistance which exceeds by 0.2 units in the Bayer abrader scale the scratch resistance of a solid formed by curing the same resin which does not contain silica or fine mesh surface treated silica.

18. A resin for forming a coating upon an optical preform in a gasketless casting process, comprising:

about 50–90% by weight of a polymerizable base component, between about 0.5% and 6% by weight of a photoinitiator, and between about 0.5% and 20% by weight of a viscosity control agent, wherein the resin has a viscosity greater than 25 centistokes and less than 130 centistokes at 68° F.

19. The resin of claim 1, further comprising an anti-reflective component.

20. The resin of claim 19, wherein the anti-reflective component comprises at least one perfluoroalkyl acrylate.

21. A resin as recited in claim 1, having a viscosity of between about 35 and 90 centistokes at 68° F.

22. A resin composition as recited in claim 11, having a viscosity of between about 35 and 90 centistokes at 68° F.

23. A resin for forming a coating upon an optical preform in a gasketless casting process, comprising:

about 50% to 90% by weight of a polymerizable base component;

no more than about 25% by weight of a cross-linker;

between about 0.5% and 6% by weight of an initiator; and between about 0.5% and 20% by weight of a viscosity control agent selected from the group consisting of fine mesh silica, fumed silica, acrylic acid ester polymers, polymethyl methacrylate molding powder, and mixtures thereof;

wherein the resin has a viscosity greater than about 25 centistokes and less than about 130 centistokes at 68° F.

24. A resin as recited in claim 23, wherein the viscosity control agent is present in an amount of between about 0.5% and 3.5% by weight.

25. A resin as recited in claim 23, wherein the base component comprises at least one compound selected from the group consisting of allylic compounds and acrylic compounds.

26. A resin as recited in claim 23, wherein the base component comprises a bis(allyl) carbonate.

27. A resin as recited in claim 26, wherein the bis(allyl) carbonate comprises at least one compound selected from the group consisting of diethylene glycol bis(allyl) carbonate and bisphenol A diallyl carbonate.

28. A resin as recited in claim 23, having a viscosity of between about 35 and 90 centistokes at 68° F.

29. A resin for forming a coating upon an optical preform in a gasketless casting process, comprising:

from about 50% to about 90% by weight of a polymerizable allylic base component;

no more than about 25% by weight of a cross-linker;

between about 0.5% and 6% by weight of an initiator; and between about 0.5% and 20% by weight of a viscosity control agent;

wherein the resin has a viscosity greater than about 25 centistokes and less than about 130 centistokes at 68° F.

30. A resin as recited in claim 29, wherein the polymerizable allylic base component comprises at least one bis(allyl) carbonate.

31. A resin as recited in claim 30, wherein at least one bis(allyl) carbonate is selected from the group consisting of diethylene glycol bis(allyl) carbonate and bisphenol A diallyl carbonate.

32. A resin as recited in claim 29, wherein the viscosity control agent is selected from the group consisting of fine mesh silica, fumed silica, acrylic acid ester polymers, polymethyl methacrylate molding powder, and mixtures thereof.

33. A resin as recited in claim 29, having a viscosity of between about 35 and 90 centistokes at 68° F.

34. A resin for forming a coating upon an optical preform in a gasketless casting process, comprising:

about 50% to 90% by weight of a polymerizable base component;

no more than about 25% by weight of a cross-linker; and between about 0.5% and 6% by weight of an initiator;

wherein the resin has a viscosity greater than about 25 centistokes and less than about 130 centistokes at 68° F.

35. A resin as recited in claim 34, wherein the polymerizable base component comprises at least one compound selected from the group consisting of allylic compounds and acrylic compounds.

36. A resin as recited in claim 35, wherein the polymerizable base component comprises a bis(allyl) carbonate.

37. A resin as recited in claim 34, wherein the crosslinker comprises at least one multifunctional acrylic.

38. A resin as recited in claim 34, wherein the initiator comprises a photoinitiator, a thermal initiator, or both a photoinitiator and a thermal initiator.

* * * * *

UNITED STATES PATENT AND TRADEMARK OFFICE
CERTIFICATE OF CORRECTION

PATENT NO. : 5,470,892
DATED : November 28, 1995
INVENTOR(S) : Amitava Gupta; Ronald D. Blum It is certified that error appears in the above-indentified patent and that said Letters Patent is hereby corrected as shown below:

```
Column 2, lines 20,21,48, change "Lipscombet al." to
          -- Lipscomb et al. -- (both occurrences).
Column 2, line 59, change "to a semi-finished blanks" to
          -- to semi-finished blanks --.
Column 9, line 23, change "relocate,the" to
          -- relocate the --.
Column 9, line 54, after "having" change "an" to --a --.

Column 10, line 1, after "correction" insert a period.
Column 10, line 11, following "embodiment" insert -- of --.
Column 10, line 12, before "addition" insert -- the --.
Column 10, line 48, before "also" delete the period.
Column 11, line 57, change "it's" to -- its --.
Column 12, lines 37,38,43, change "it's" to -- its --
          (all occurrences).
Column 12, line 67, replace "concluding" with
          -- including --.
Column 13, line 5, change "it's" to -- its --.

Column 19, line 9, change "wave length" to
          -- wavelength --.
Column 25, line 29, between "time" and "which" insert
          -- in --.
Column 26, line 46, change "it's" to -- its --.
Column 29, line 42, after "mold" delete the period.
Column 31, lines 35-37, delete the sentence starting
          with "Care should" and ending with "curing
          chamber."
Column 34, lines 10,11, change "bromonophthalene" to
          -- bromonaphthalene --.
```

UNITED STATES PATENT AND TRADEMARK OFFICE
CERTIFICATE OF CORRECTION

PATENT NO. : 5,470,892
DATED : November 28, 1995
INVENTOR(S) : Amitava Gupta; Ronald D. Blum It is certified that error appears in the above-indentified patent and that said Letters Patent is hereby corrected as shown below:

Column 35, line 42, after "angle" change ";" to
-- , --.
Column 37, line 24, replace "instance" with
-- substance --.
Column 40, line 27, change "crosslinker" to
-- cross-linker --.

Signed and Sealed this

Seventeenth Day of December, 1996

Attest:

BRUCE LEHMAN

Attesting Officer

Commissioner of Patents and Trademarks